US007710606B2

(12) United States Patent
Suzuki et al.

(10) Patent No.: US 7,710,606 B2
(45) Date of Patent: May 4, 2010

(54) IMAGE PROCESSING METHOD, PRINTER DRIVER, IMAGE PROCESSING APPARATUS, IMAGE FORMING APPARATUS AND IMAGE FORMING SYSTEM

(75) Inventors: Daisuke Suzuki, Kanagawa (JP); Masakazu Yoshida, Kanagawa (JP); Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 10/586,797

(22) PCT Filed: Nov. 28, 2005

(86) PCT No.: PCT/JP2005/022238

§ 371 (c)(1),
(2), (4) Date: Jul. 19, 2006

(87) PCT Pub. No.: WO2006/057457

PCT Pub. Date: Jun. 1, 2006

(65) Prior Publication Data

US 2008/0231904 A1 Sep. 25, 2008

(30) Foreign Application Priority Data

Nov. 29, 2004 (JP) ............................. 2004-344602

(51) Int. Cl.
*G06K 15/00* (2006.01)
*G06K 9/00* (2006.01)

(52) U.S. Cl. ............... 358/3.14; 358/1.9; 358/3.12; 358/3.13; 358/3.23; 358/534; 382/252; 382/190; 382/181

(58) Field of Classification Search ................ 358/1.9, 358/3.14, 3.05, 3.13, 3.16, 3.23, 3.3, 534; 345/596, 616; 347/131; 348/574; 399/181; 382/252, 254, 176, 270, 321, 229, 191, 237, 382/173, 190, 181
See application file for complete search history.

(56) References Cited

U.S. PATENT DOCUMENTS

| 7,011,386 | B2 * | 3/2006 | Iwasaki et al. ................. 347/23 |
| 7,499,198 | B2 * | 3/2009 | Hirano ....................... 358/3.14 |
| 2003/0025749 | A1 | 2/2003 | Krouss |

(Continued)

FOREIGN PATENT DOCUMENTS

JP          11-048587          2/1999

(Continued)

OTHER PUBLICATIONS

May 7, 2009 European search report in connection with a counterpart European patent application No. 05 81 1251.

*Primary Examiner*—King Y Poon
*Assistant Examiner*—Steven Kau
(74) *Attorney, Agent, or Firm*—Cooper & Dunham LLP

(57) ABSTRACT

An image processing method processes image data to be output to an image forming apparatus that is capable of making a two-way recording to form an image on a recording medium by recording in a forward path and a return path of a scan by an ink-jet recording head. The image processing method includes a halftone process that is based on an inclined line-group keytone and maintains keytone continuity, including a dither process in which the inclined line-group keytone appears at a stage where the recording in the forward path is made.

11 Claims, 21 Drawing Sheets

U.S. PATENT DOCUMENTS

| | | |
|---|---|---|
| 2003/0133160 A1 | 7/2003 | Sharma et al. |
| 2004/0169710 A1 | 9/2004 | Ide et al. |
| 2005/0200900 A1 | 9/2005 | Hirano |

FOREIGN PATENT DOCUMENTS

| | | |
|---|---|---|
| JP | 2004-009333 | 1/2004 |
| JP | 2004-080065 | 3/2004 |
| JP | 2004-122496 | 4/2004 |
| JP | 2004-166163 | 6/2004 |
| JP | 2004-188627 | 7/2004 |
| WO | WO03/105461 A1 | 12/2003 |

* cited by examiner

FIG.24

|  |  |  |  | 18 |  |  |  |  | 0 |
|---|---|---|---|---|---|---|---|---|---|
|  |  |  | 2 |  |  |  |  | 13 |  |
|  |  | 11 |  |  |  |  | 8 |  |  |
|  | 6 |  |  |  | 19 |  |  |  |  |
| 14 |  |  |  | 4 |  |  |  |  |  |
|  |  |  |  | 17 |  |  |  |  | 12 |
|  |  |  | 10 |  |  |  |  | 1 |  |
|  |  | 3 |  |  |  |  | 9 |  |  |
|  | 15 |  |  |  | 16 |  |  |  |  |
| 7 |  |  |  |  | 5 |  |  |  |  |

→
RECORDING IN RETURN PATH

ALREADY FORMED KEYTONE LINE

KEYTONE LINE IN THE PROCESS OF BEING FORMED

IMAGE PROCESSING METHOD, PRINTER DRIVER, IMAGE PROCESSING APPARATUS, IMAGE FORMING APPARATUS AND IMAGE FORMING SYSTEM

TECHNICAL FIELD

The present invention generally relates to image processing methods, printer drivers, image processing apparatuses, image forming apparatuses and image forming systems, and more particularly to an image processing method, a printer driver, an image processing apparatus, an image forming apparatus and an image forming system that are suited for carrying out an ink-jet recording.

BACKGROUND ART

As image forming apparatuses such as printers, facsimile apparatuses, copying apparatuses and composite (or multi-function) apparatuses having the functions of the printer, facsimile apparatus and copying apparatus, there are the so-called ink-jet recording apparatuses which use an ink-jet recording head, for example. The ink-jet recording apparatus makes an image formation on a recording medium by ejecting ink from the ink-jet recording head onto the recording medium. The recording medium may be paper, OHP film or any suitable recording sheet onto which the ink may be adhered. The image formation includes various kinds of recording and printing of characters, images and/or photographs.

In such an ink-jet recording apparatus, increasing the resolution is one element for increasing the picture quality of the image that is formed on the recording medium. A pitch of nozzles of the recording head that ejects the ink may be reduced in order to obtain a high resolution. However, since there is a physical limit to reducing the nozzle pitch, the so-called interlace scanning is carried out so as to obtain a resolution that is an integer multiple of the nozzle pitch, with the sub scanning (or recording sheet feeding) accuracy and the impact dot diameter permitting.

Increasing the operation speed (or recording speed) of the ink-jet recording apparatus is another important element besides increasing the picture quality. Particularly in the case of a serial scan type image forming apparatus in which the recording head scans in a main scanning direction and the recording sheet is fed in a sub scanning direction, it is possible to achieve a recording speed that is approximately two times that of a one-way recording, by carrying out a two-way recording (or bi-directional recording) which ejects the ink onto the recording sheet during both a forward path (or down-path path) and a return path (or up-path) of the recording head scan in the main scanning direction.

But when the two-way recording is carried out, it is difficult to completely match the impact positions of the ink drops on the recording medium between the forward and return paths of the recording head, and a slight error occurs between the impact positions of the ink drops on the recording medium between the forward and return paths of the recording head. For this reason, when an attempt is made to simultaneously achieve a high-speed operation (or high-speed recording) and a high picture quality by simultaneously carrying out the interlace scanning and the two-way recording, the impact position error occurs for every other line (this impact position error will be referred to as a "two-way impact error") and the picture quality greatly deteriorates as a result.

Japanese Laid-Open Patent Applications No. 11-48587 and No. 2004-288627 propose preventing the picture quality from becoming deteriorated by the above two-way impact error, by providing a pattern that can easily correct the impact positions before a user uses the recording apparatus, and enabling the user to carry out a correction operation based on this pattern.

A Japanese Laid-Open Patent Application No.2004-9333 proposes another method that records the dots with a priority in the forward path of the main scan, and filling the dots in the return path for gradation levels amounting to 50% or more of the recording density of the dots.

Furthermore, a Japanese Laid-Open Patent Application No.2004-166163 proposes a gradation reproducing method which carries out a halftone process using a dither matrix, by reproducing the gradation level by an inclined line-group keytone.

In the ink-jet recording apparatus, the gradation image may be formed by forming four kinds of dot sizes (large, medium, small and nil) by selectively ejecting ink with three kinds of ink drop sizes, namely, large ink drop, medium ink drop and small ink drop. But in this case, the extent of the two-way impact error becomes different depending on the ink drop sizes.

For example, if the recording head that ejects the ink uses a piezoelectric element, the kinetic energy of the ink drop, the air resistance the ink drop receives during flight and a driving signal waveform applied to the piezoelectric element to eject the ink drop respectively differ depending on the ink drop size. As a result, the amount of impact position error of the ink drop that is ejected from the recording head differs depending on the ink drop size. Moreover, if the nozzle diameters are made different in order to eject the ink with the different ink drop sizes, the amount of impact position error of the ink drop that is ejected from the recording head is also affected by the precision with which the recording head is made.

In other words, when carrying out the two-way recording by selectively ejecting the ink with the different ink drop sizes, it is extremely difficult to accurately match the impact positions of the ink drops for all ink drop sizes.

For this reason, there is a limit to suppressing the picture quality deterioration caused by the two-way impact error even if the methods proposed in the Japanese Laid-Open Patent Applications No.11-48587 and No.2004-188627 are employed. Accordingly, when generating the image data, the halftone process must be carried out under the precondition that the two-way impact error will occur, but this precondition was not take into consideration by the conventional methods.

On the other hand, although the Japanese Laid-Open Patent Application No.2004-9333 proposes a suitable method from the point of view of suppressing the picture quality deterioration caused by the two-way impact error, the dots formed by the small ink drops will be arranged linearly along the main scanning direction for every other line at the gradation level where the recording density of the small ink drops is 50%, for example. But such a dot arrangement is easily affected by inconsistencies in the sub scanning direction and inconsistencies in the ink ejection of the nozzles, and another problem is introduced in that a banding is easily generated.

The dither process based on the inclined line-group keytone as proposed in the Japanese Laid-Open Patent Application No.2004-166163 will not easily generate the banding.

However, another problem is introduced in that a disorder of the inclined line-group keytone is generated if the two-way impact error occurs.

SUMMARY

In an aspect of this disclosure, there are provided an image processing method, printer driver, image processing apparatus, image forming apparatus and image forming system, which can improve the picture quality by reducing the disorder of the inclined line-group keytone caused by the two-way impact error.

In another aspect of this disclosure, there is provided an image processing method for processing image data to be output to an image forming apparatus that is capable of making a two-way recording to form an image on a recording medium by recording in a forward path and a return path of a scan by an ink-jet recording head, comprising a halftone process that is based on an inclined line-group keytone and maintains keytone continuity, wherein the halftone process includes a dither process in which the inclined line-group keytone appears at a stage where the recording in the forward path is made. According to the above-mentioned image processing method, it is possible to improve the picture quality by reducing the disorder of the inclined line-group keytone caused by the two-way impact error.

In another aspect of this disclosure, there is provided a printer driver for causing a computer to execute a halftone process according to the above image processing method, to output the image data to the image forming apparatus. According to the above-mentioned printer driver, it is possible to improve the picture quality by reducing the disorder of the inclined line-group keytone caused by the two-way impact error.

In another aspect of this disclosure, there is provided an image processing apparatus provided with the above printer driver, to carry Out a halftone process with respect to the data to be output to the image forming apparatus. According to the above-mentioned image processing apparatus, it is possible to improve the picture quality by reducing the disorder of the inclined line-group keytone caused by the two-way impact error.

In another aspect of this disclosure, there is provided an image forming apparatus capable of making a two-way recording to form an image on a recording medium by recording in a forward path and a return path of a scan by an ink-jet recording head, comprising a halftone process part configured to carry out a halftone process that is based on an inclined line-group keytone and maintains keytone continuity, wherein the halftone process part includes a dither process part configured to carry out a dither process in which the inclined line-group keytone appears at a stage where the recording in the forward path is made. According to the above-mentioned image forming apparatus, it is possible to improve the picture quality by reducing the disorder of the inclined line-group keytone caused by the two-way impact error.

In another aspect of this disclosure, there is provided an image forming system comprising the above image processing apparatus and the above image forming apparatus. According to the above-mentioned image forming system, it is possible to improve the picture quality by reducing the disorder of the inclined line-group keytone caused by the two-way impact error.

Other aspects and features will be apparent from the following detailed description when read in conjunction with the accompanying drawings.

BRIEF DESCRIPTION OF THE DRAWINGS

FIG. 24 is a diagram showing an example of a conventional dither matrix (threshold value matrix);

BEST MODE FOR CARRYING OUT THE INVENTION

Figure 1:
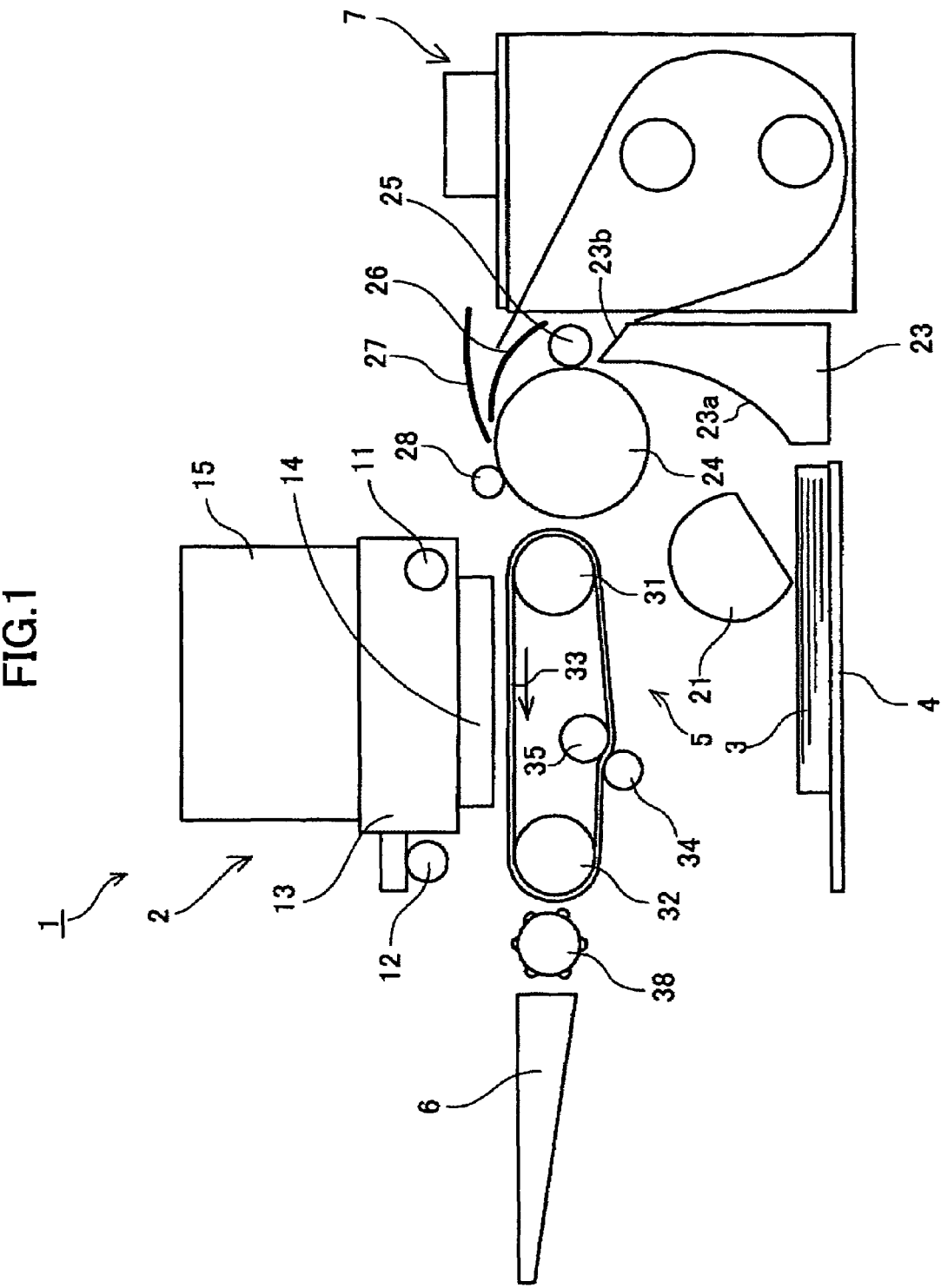
FIG. 1 is a cross sectional view generally showing a mechanical part of an ink-jet recording apparatus.

A description will be given of embodiments of an image processing method, printer driver, the image processing apparatus, image forming apparatus and image forming system according to the present invention, by referring to the drawings.

Figure 2:
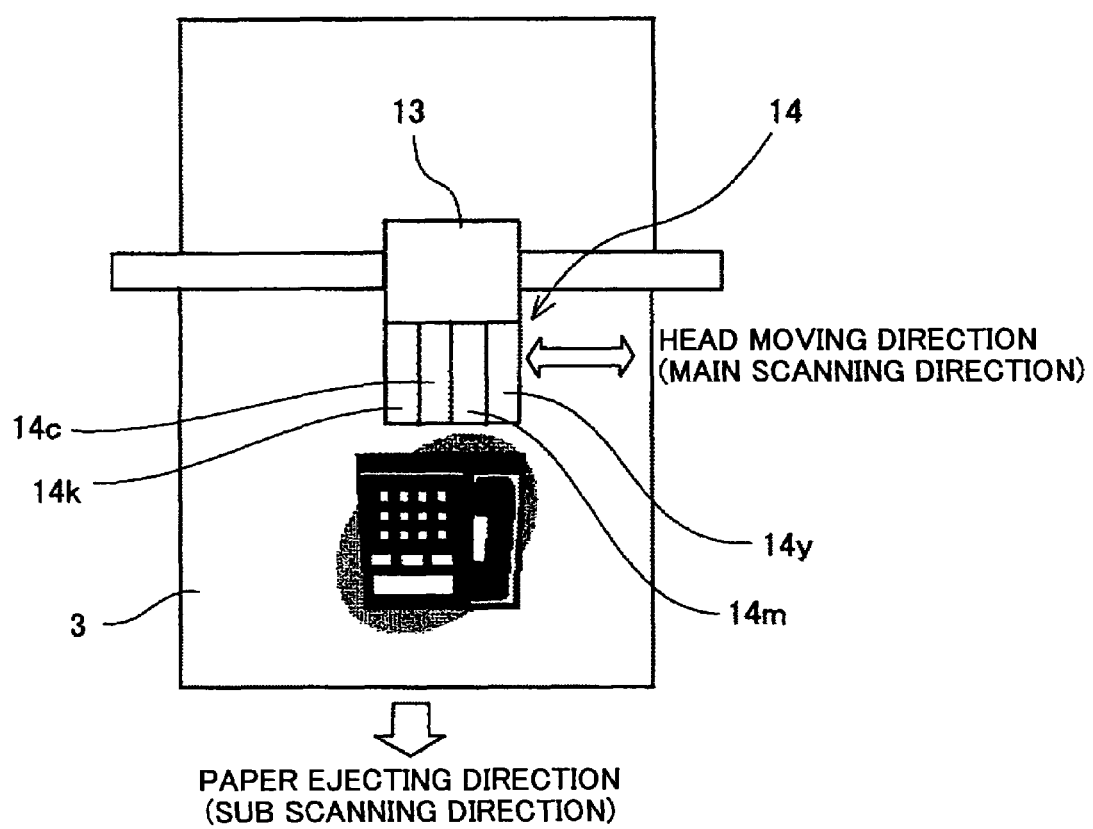
FIG. 2 is a plan view for explaining an important part of the ink-jet recording apparatus.
Figure 3:
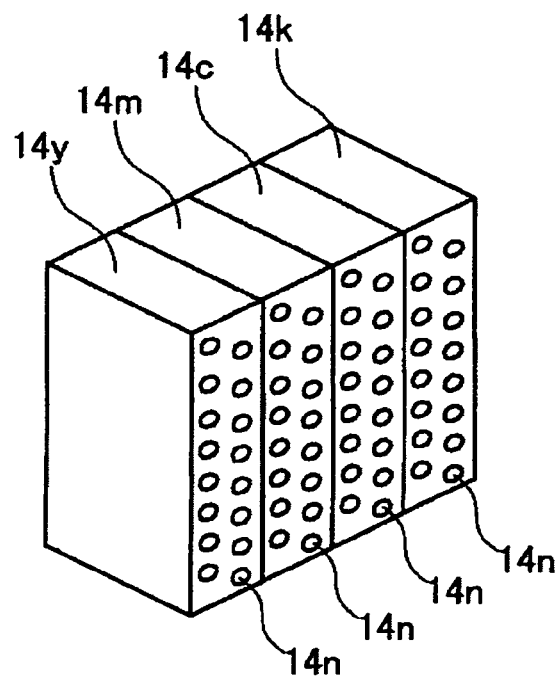
FIG. 3 is a perspective view for explaining a head structure of the ink-jet recording apparatus.
Figure 4:
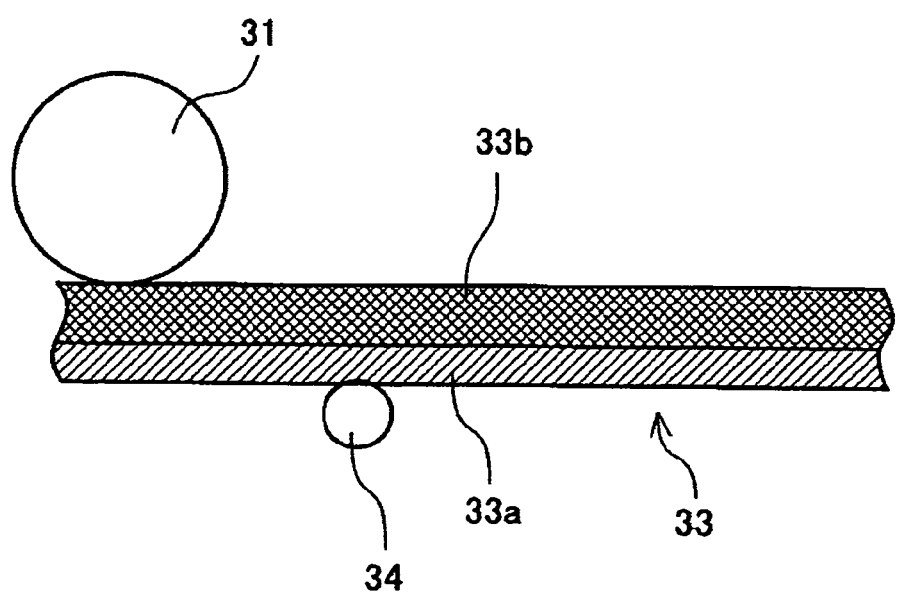
FIG. 4 is a cross sectional view for explaining a transport belt of the ink-jet recording apparatus.

First, a description will be given of an embodiment of the image forming apparatus according to the present invention, by referring to FIGS. 1 through 4. In this embodiment, the present invention is applied to an ink-jet recording apparatus. FIG. 1 is a cross sectional view generally showing a mechanical part of the ink-jet recording apparatus. FIG. 2 is a plan view for explaining an important part of the ink-jet recording apparatus. FIG. 3 is a perspective view for explaining a head structure of the ink-jet recording apparatus. FIG. 4 is a cross sectional view for explaining a transport belt of the ink-jet recording apparatus.

The ink-jet recording apparatus is made up of a main apparatus body 1 which includes therein an image forming part 2 and the like. A paper supply tray 4 is provided on a lower side of the main apparatus body 1, and a plurality of recording media (hereinafter simply referred to as paper) 3 can be stacked on this paper supply tray 4. The paper 3 supplied from the paper supply tray 4 is transported by a transport mechanism 5. The image forming part 2 records an image on the paper 3 that is transported by the transport mechanism 5, and the paper 3 is thereafter ejected onto a paper eject tray 6 that is provided on a side of the main apparatus body 1.

A duplex unit 7 is detachably provided with respect to the main apparatus body 1 of the ink-jet recording apparatus. When carrying out a duplex recording, after the image is recorded on one side (or front surface) of the paper 3, the paper is transported in a reverse direction by the transport mechanism 5 and supplied into the duplex unit 7 which turns over the paper 3 so that the recording can be made on the other side (or back surface) of the paper 3. The paper 3 is then supplied again to the transport mechanism 5, and after the image is recorded on the other side (or back surface) of the paper 3 by the image forming part 2, the paper 3 is finally ejected onto the paper eject tray 6.

The image forming part 2 includes a carriage 13 that is slidably supported by guide shafts 11 and 12 and is moved in a main scanning direction that is perpendicular to the transport direction of the paper 3 by a main scan motor (not shown). A recording head 14 is mounted on the carriage 13. The recording head 14 is formed by a plurality of ink-jet heads 14y, 14m, 14c and 14k respectively having a plurality of nozzles 14n from which the ink drops are ejected, as shown in FIG. 3. An ink cartridge 15 which supplies the ink to the recording head 14 is detachably provided on the carriage 13. A sub tank (not shown) may be provided in place of the ink cartridge 15, and in this case, the ink from a main tank (not shown) is supplied to the sub tank.

The four independent ink-jet heads 14y, 14m, 14g and 14k which form the recording head 14 respectively eject yellow (Y), magenta (M), cyan (C) and black (K) ink drops, as shown in FIGS. 2 and 3, for example. Of course, the recording head 14 may be formed by one or a plurality of independent ink-jet heads, as long as one or a plurality of rows of nozzles are provided for ejecting the ink of each of the different colors. The number of colors used and the order in which the four ink-jet heads 14y, 14m, 14c and 14k are arranged are not limited to those shown for this embodiment.

Each ink-jet head forming the recording head 14 may be provided with an energy generating means (or pressure generating means) for ejecting the ink, such as a piezoelectric actuator using a piezoelectric element or the like, a thermal actuator which utilizes a phase change caused by a film boiling of the ink using an electrothermal conversion element such as a heating resistor, a shape memory alloy actuator that utilizes a metallic phase change, and an electrostatic actuator that utilizes electrostatic force.

The paper 3 on the paper supply tray 4 is separated one by one by a paper supply roller (or semicircular roller) 21 and a separation pad (not shown). The separated paper 3 is supplied inside the main apparatus body 1, to the transport mechanism 5.

The transport mechanism 5 includes a transport guide part 23 for guiding the paper 3 that is supplied via the paper supply roller 21 upwards along a guide surface 23a and guides the paper 3 that is supplied from the duplex unit 7 along a guide surface 23b, a transport roller 24 for transporting the paper 3, a pressing roller 25 for pressing the paper 3 against the transport roller 24, a guide member 26 for guiding the paper 3 towards the transport roller 24, a guide member 27 for guiding the paper 3 that is returned at the time of the duplex recording to the duplex unit 7, and a pushing roller 28 for pushing against the paper 3 that is transported from the transport roller 24.

The transport mechanism 5 further includes a transport belt 33 that is provided between a driving roller 31 and a following roller (or tension roller) 32 and transports the paper 3 while maintaining the paper 3 flat between the recording head 14 and the transport belt 33, a charging roller 34 for charging the transport belt 33, a guide roller 35 confronting the charging roller 34, a guide member (or platen plate, not shown) for guiding the transport belt 33 at a portion confronting the image forming part 2, a cleaning means (not shown) for cleaning the transport belt 33 by removing the ink that is adhered on the transport belt 33, and the like. For example, the cleaning means may be formed by a cleaning roller that is made of a porous material.

The transport belt 33 is formed by an endless belt that is provided between the driving roller 31 and the following roller 32, and circulates in a direction (or paper transport direction) indicated by an arrow in FIG. 1.

The transport belt 33 may have a single-layer structure or multi-layer structure. FIG. 4 shows a case where the transport belt 33 has a multi-layer structure made up of two layers, namely, a first layer (or surface layer) 33a and a second layer (or back layer) 33b. However, the transport belt 33 may have a multi-layer structure made up of three or more layers. For example, the first layer (or surface layer) 33a is made of a pure resin material which has not been subjected to a resistance control and has a thickness on the order of approximately 40 μm, such as pure ETFE material, and the second layer (or intermediate resistance layer, ground layer) 33b is made of the same material as the first layer 33a but which has been subjected to a resistance control using carbon.

The charging roller 34 is arranged so as to make contact with the surface layer 33a of the transport belt 33 and rotate to follow the circulating movement of the transport belt 33. A high voltage having a predetermined pattern is applied to the charging roller 34 from a high voltage circuit (or high voltage source, not shown).

A paper eject roller 38 is provided on a downstream side of the transport mechanism 35. The paper 3 that is recorded with the image by the image forming part 2 is ejected onto the paper eject tray 6 via the paper eject roller 38.

In the ink-jet recording apparatus having the structure described above, the transport belt 33 which circulates in the direction of the arrow in FIG. 1 is charged to a positive polarity by making contact with the charging roller 34 that is applied with a voltage (AC bias voltage) having a high potential. In this case, the polarity of the voltage applied to the charging roller 34 is switched at predetermined time intervals, so that the transport belt 33 is charged with a polarity that is alternatively switched between positive and negative polarities at a predetermined charging pitch.

When the paper 3 is supplied onto the transport belt 33 that has been charged to the high potential, the inside of the paper 3 assumes a polarized state, and a charge having a polarity opposite to that on the transport belt 33 is induced on the surface of the paper 3 in contact with the transport belt 33. As a result, the charge on the transport belt 33 and the charge induced on the surface of the paper 3 are electrostatically attracted to each other, and the paper 3 is electrostatically adhered on the transport belt 33. Hence, the warp and unevenness of the paper 3 are corrected by being strongly adhered on the transport belt 33, thereby forming a highly flat surface of the paper 3 on the transport belt 33.

Figure 5:
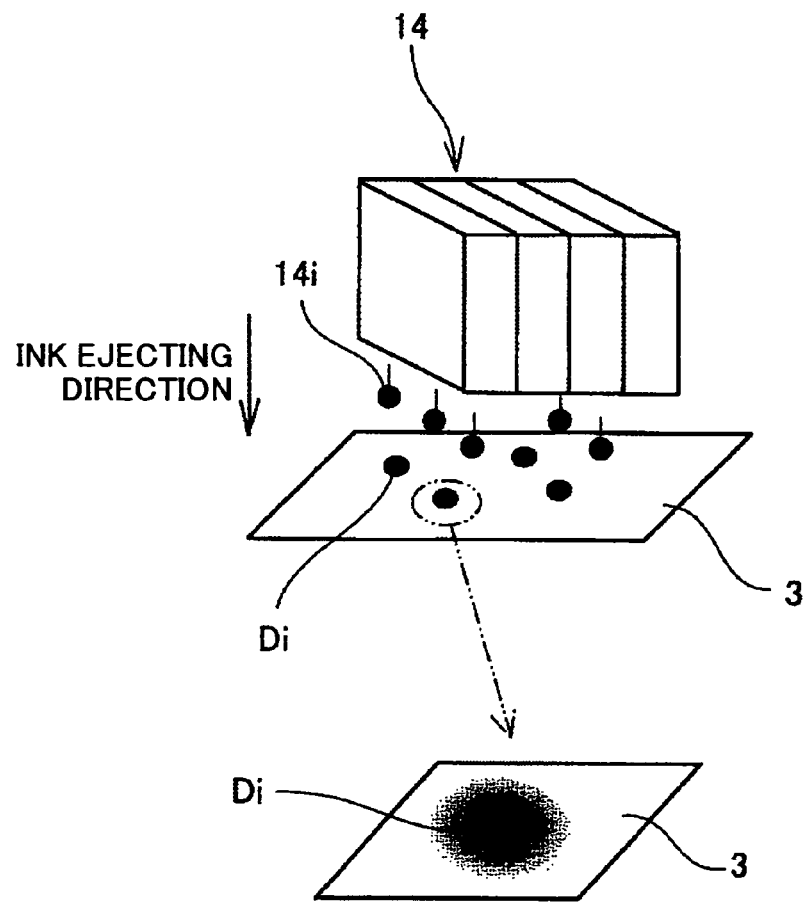
FIG. 5 is a perspective view for explaining an image forming operation of the ink-jet recording apparatus.

The transport belt 33 circulates to move the paper 3, and the recording head 14 is driven in response to an image signal while the carriage 13 moves and scans in one direction (or down-path) to make a one-way recording or in two directions (or down-path and up-path) to make a two-way recording. Hence, as shown in FIG. 5, ink drops 14i are ejected (or sprayed) from the recording head 14 and form dots Di on the stationary paper 3. After forming the dots Di amounting to 1 line, the paper 3 is transported by a predetermined amount, and the next line is then recorded on the paper 3. The recording operation ends in response to a recording end signal or a signal indicating that a rear end (or trailing end) of a recording region on the paper 3 is reached. A lower portion of FIG. 5 indicates, on an enlarged scale, a part that is surrounded by a two-dot chain line in an upper portion of FIG. 5.

The paper 3 having the image recorded thereon in the above described manner is ejected onto the paper eject tray 6 by the paper eject roller 38.

In this embodiment, the ink-jet recording apparatus uses the recording head 14 that uses four colors, that is, the ink-jet heads 14y, 14m, 14c and 14k. However, the recording head 14 is not limited to the 4-color head structure. For example, the recording head 14 may have a 6-color head structure shown in FIG. 6 or 7 or, a 7-color head structure shown in FIG. 8 or 9. Of course, the colors and the order in which the colors are arranged in each of these head structures are not limited to those shown in FIGS. 6 through 9.

Figure 6:
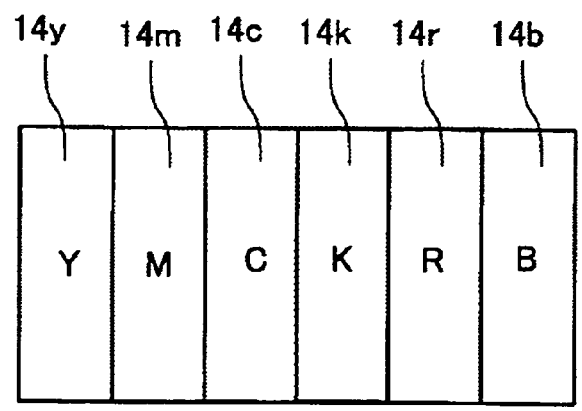
FIG. 6 is a diagram for explaining a head structure having nozzles for red ink and blue ink in addition to nozzles for yellow ink, magenta ink, cyan ink and black ink.

FIG. 6 is a diagram for explaining a head structure having nozzles for red (R) ink and blue (B) ink in addition to the nozzles for the yellow (Y) ink, magenta (M) ink, cyan (C) ink and black (K) ink. In other words, the recording head 14 shown in FIG. 6 includes ink-jet heads 14r and 14b for respectively ejecting the red (R) ink and the blue (B) ink, in addition to the ink-jet heads 14y, 14m, 14c and 14k for respectively ejecting the yellow (Y), magenta (M), cyan (C) and black (K) ink. Of course, the recording head 14 may be formed by one or a plurality of independent ink-jet heads, as long as one or a plurality of rows of nozzles are provided for ejecting the ink of each of the different colors, and the same holds true for the head structures shown in FIGS. 7 through 9.

Figure 7:
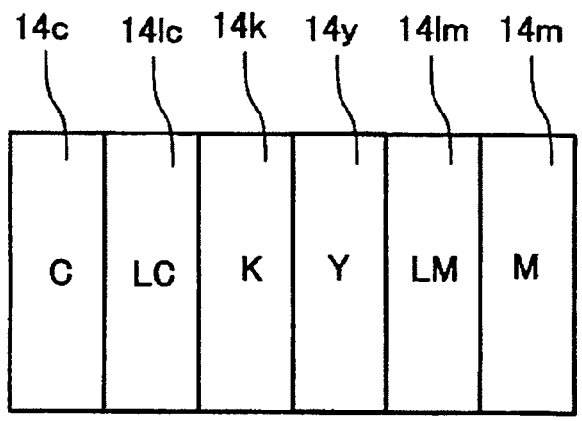
FIG. 7 is a diagram for explaining a head structure having nozzles for light cyan ink and nozzles for light magenta ink in addition to the nozzles for yellow ink, magenta ink, cyan ink and black ink.

FIG. 7 is a diagram for explaining a head structure having nozzles for light cyan (LC) ink and nozzles for light magenta (LM) ink in addition to the nozzles for yellow (Y) ink, magenta (M) ink, cyan (C) ink and black (K) ink. In other words, the recording head 14 shown in FIG. 7 includes ink-jet heads 14lc and 14lm for respectively ejecting the light cyan (LC) ink and the light magenta (LM) ink, in addition to the ink-jet heads 14y, 14m, 14c and 14k for respectively ejecting the yellow (Y), magenta (M), cyan (C) and black (K) ink.

Figure 8:
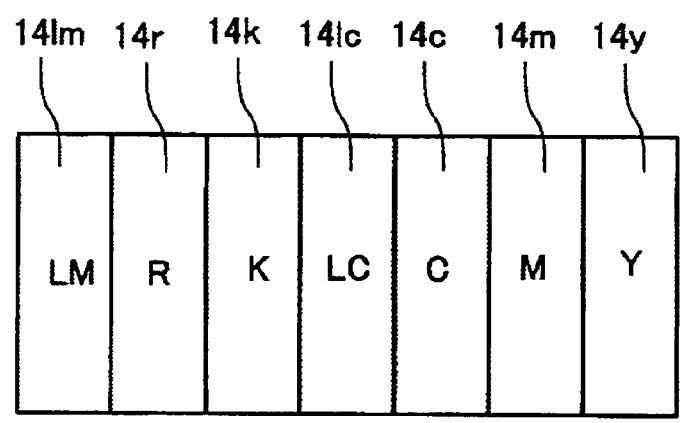
FIG. 8 is a diagram for explaining a head structure having nozzles for red ink in addition to the nozzles of the head structure shown in FIG. 7.

FIG. 8 is a diagram for explaining a head structure having nozzles for red (R) ink in addition to the nozzles of the head structure shown in FIG. 7. In other words, the recording head 14 shown in FIG. 8 includes an ink-jet head 14r for ejecting the red (R) ink, in addition to the ink-jet heads 14y, 14m, 14c, 14k, 14lc and 14lm for respectively ejecting the yellow (Y), magenta (M), cyan (C), black (K), light cyan (LC) and light magenta (LM) ink.

Figure 9:
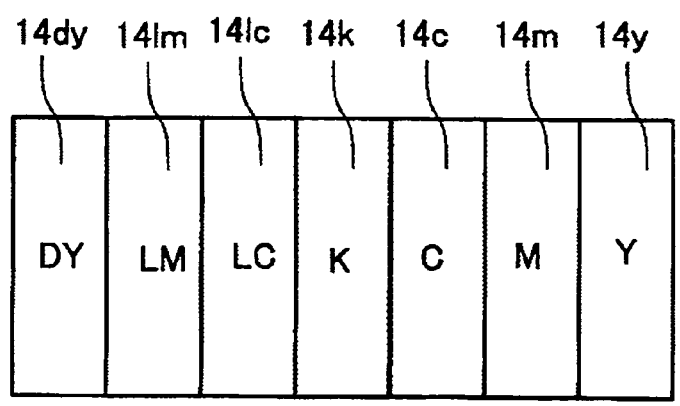
FIG. 9 is a diagram for explaining a head structure having nozzles for dark yellow ink in addition to the nozzles of the head structure shown in FIG. 7.
Figure 10:
FIG. 10 is a diagram showing a chemical formula (1) that represents a penetrating agent.
Figure 11:
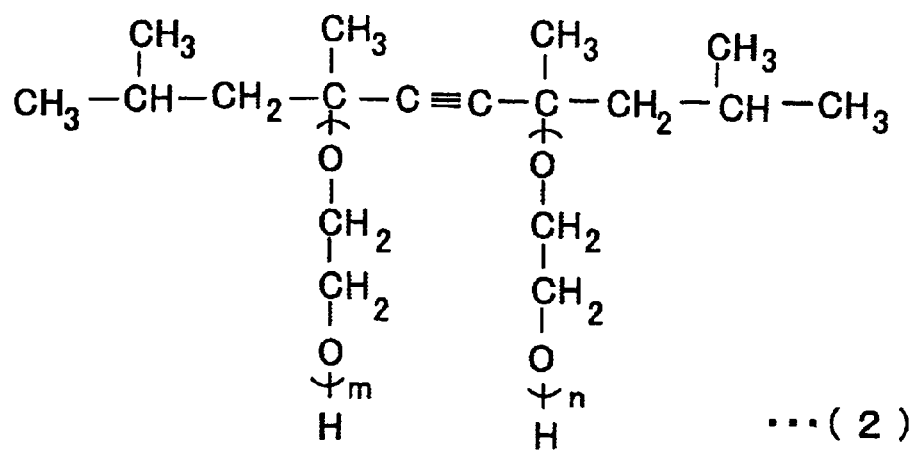
FIG. 11 is a diagram showing a chemical formula (2) that represents the penetrating agent.
Figure 12:
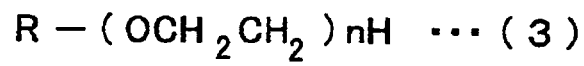
FIG. 12 is a diagram showing a chemical formula (3) that represents the penetrating agent.
Figure 13:
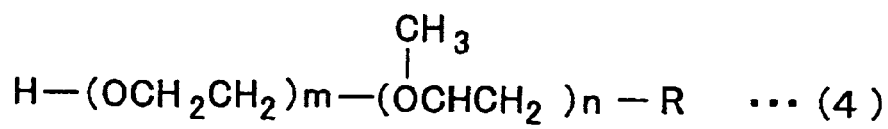
FIG. 13 is a diagram showing a chemical formula (4) that represents the penetrating agent.

FIG. 9 is a diagram for explaining a head structure having nozzles for dark yellow (DY) ink in addition to the nozzles of the head structure shown in FIG. 7. In other words, the recording head 14 shown in FIG. 9 includes an ink-jet head 14r for ejecting the dark yellow (DY) ink, in addition to the ink-jet heads 14y, 14m, 14c, 14k, 14lc and 14lm for respectively ejecting the yellow (Y), magenta (M), cyan (C), black (K), light cyan (LC) and light magenta (LM) ink.

Next, a description will be given of the ink that may be used in the ink-jet recording apparatus.

The pigments, that is, the coloring materials for the ink used in the ink-jet recording apparatus are not limited to particular materials in the present invention, and for example, the following pigments may be used to suit the needs. Furthermore, it is of course possible to use a mixture of a plurality of kinds of such pigments.

Organic pigments that may be used include azo pigments, phtalocyanine pigments, anthraquinone pigments, quinacridon pigments, dioxazine pigments, indigo pigments, thioindigo pigments, perylene pigments, isoindrinone pigments, aniline black pigments, azo metine pigments, Rhodamine B lake pigments, carbon black pigments and the like.

Inorganic pigments that may be used include iron oxide pigments, titanium oxide pigments, calcium carbonate pigments, barium sulfate pigments, aluminum hydroxide pigments, barium yellow pigments, iron blue pigments, cadmium red pigments, chrome yellow pigments, metal powder pigments and the like.

The grain diameter of the pigment is preferably in a range of 0.01 to 0.30 µm. If the grain diameter of the pigment is 0.01 µm or less, the grain diameter approaches that of the dye, and the light resistance and the feathering deteriorate. In addition, if the grain diameter of the pigment is 0.30 µm or greater, clogging of the nozzles and clogging of the filter within the ink-jet recording apparatus occur, to prevent a stable ink-jet operation.

The carbon black usable for the black pigment ink may be produced by the furnace method or the channel method, and preferably has a primary grain diameter of 15 to 40 mµ, a specific surface area by the BET method of 50 to 300 m$^2$/g, a DBP oil absorption of 40 to 150 ml/100 g, a volatile matter of 0.5 to 10%, and a pH value of 2 to 9. For example, No. 2300, No. 900, MCF-88, No. 33, No. 40, No. 45, No. 52, MA7, MA8, MA100 and No. 2200B manufactured by Mitsubishi Chemicals, Raven 700, Raven 5750, Raven 5250, Raven 5000, Raven 3500 and Raven 1255 manufactured by Columbia, Regal 1400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot, carbon black FW1, carbon black FW2, carbon black FW2V, carbon black FW18, carbon black FW200, carbon black S150, carbon black S160, carbon black S170, printex 35, printex U, printex V, printex 140U, printex 140V, special black 6, special black 5, special black 4A and special black 4 manufactured by Degussa, and the like may be used as the carbon black, but the carbon black that may be used is of course not limited to such.

Particular examples of the color pigments that may be used include the following.

Organic pigments include azo pigments, anthracyanine pigments, anthraquinone pigments, quinacridon pigments, dioxazine pigments, indigo pigments, thioindigo pigments, perylene pigments, isoindridnone pigments, aniline black pigments, azo metine pigments, Rhodamine B lake pigments, carbon black pigments and the like. Inorganic pigments include iron oxide pigments, titanium oxide pigments, calcium carbonate pigments, barium sulfate pigments, aluminum hydroxide pigments, barium yellow pigments, iron blue pigments, cadmium red pigments, chrome yellow pigments, metal powder pigments and the like.

Depending on the color, the color pigments may include the following.

Examples of the yellow pigments that may be used for the yellow ink include C.I. pigment yellow 1, C.I. pigment yellow 2, C.I. pigment yellow 3, C.I. pigment yellow 12, C.I. pigment yellow 13, C.I. pigment yellow 14, C.I. pigment yellow 16, C.I. pigment yellow 17, C.I. pigment yellow 73, C.I. pigment yellow 74, C.I. pigment yellow 75, C.I. pigment yellow 83, C.I. pigment yellow 93, C.I. pigment yellow 95, C.I. pigment yellow 97, C.I. pigment yellow 98, C.I. pigment yellow 114, C.I. pigment yellow 128, C.I. pigment yellow 129, C.I. pigment yellow 151, C.I. pigment yellow 154 and the like, but the yellow pigment that may be used is of course not limited to such.

Examples of the magenta pigments that may be used for the magenta ink include C. I. pigment red 5, C. I. pigment red 7, C. I. pigment red 12, C. I. pigment red 48 (Ca), C. I. pigment red 48 (Mn), C. I. pigment red 57 (Ca), C. I. pigment red 57:1, C. I. pigment red 112, C. I. pigment red 123, C. I. pigment red 168, C. I. pigment red 184, C. I. pigment red 202 and the like, but the magenta pigment that may be used is of course not limited to such.

Examples of the cyan pigments that may be used for the cyan ink include C. I. pigment blue 1, C. I. pigment blue 2, C. I. pigment blue 3, C. I. pigment blue 15:3, C. I. pigment blue 15:34, C. I. pigment blue 16, C. I. pigment blue 22, C. I. pigment blue 60, C. I. vat blue 4, C. I. vat blue 60 and the like, but the cyan pigment that may be used is of course not limited to such.

Furthermore, the pigment included in the ink used may be a newly produced pigment.

The pigments described above are formed into the ink for the ink-jet recording by being dispersed within a water medium by use of a polymer dispersing agent or a surface active agent. The dispersing agent for dispersing the organic pigment powder may be a normal water soluble dispersing agent or a water soluble surface active agent.

Particular examples of the water soluble resin include styrene, styrene derivatives, vinyl naphthalene derivatives, aliphatic alcohol ester of α, β-ethylene unsaturated carbonic acid and the like, block copolymers made up of at least two or more monomers selected from a group consisting of acrylic acid, acrylic acid derivatives, maleic acid, maleic acid derivatives, itaconic acid, itaconic acid derivatives, fumaric acid and fumaric acid derivatives, random copolymers of such or, salts of such.

The water soluble resin may be an alkaline soluble resin that is soluble within a water medium having a base dissolved therein. When the water soluble resin used for the ink has a weight-average molecular weight of 3000 to 20000, it is possible to make the viscosity (or coefficient of viscosity) of the dispersant solution low and also facilitate the dispersion. Hence, it is preferable to use such a water soluble resin for the ink-jet recording.

The simultaneous use of a polymer dispersing agent and a self-dispersion type pigment is a preferable combination in that a suitable dot diameter can be obtained. Although the mechanism is not perfectly clear, it may be regarded that the suitable dot diameter is obtained for the following reasons.

By including the polymer dispersing agent in the ink, the permeability of the ink with respect to recording medium, such as the paper 3, can be suppressed. On the other hand, by including the polymer dispersing agent in the ink, the agglutination of the self-dispersion type pigment is suppressed, and the self-dispersion type pigment can spread smoothly in the lateral direction. For these reasons, it may be regarded that the dot is formed by the ink which spreads with a small thickness, and the ideal dot is formed on the recording medium.

Particular examples of the water soluble surface active agents that may be used as the dispersing agent include anionic surface active agents and cationic surface active agents. The anionic surface active agents include higher fatty acid salt, alkylsulfate, alkylether sulfate, alkylester sulfate, alkylallylether sulfate, alkylsulfonic acid salt, sulfon succinic acid salt, alkylallyl and alkylnaphthalene sulfonic acid salts, alkylphosphoric acid salt, polyoxyethylene alkylether phosphoric acid ester salt, alkylallylether phosphoric acid salt and the like. On the other hand, the cationic surface active agents include alkylamine salt, di-alkylamine salt, tetra-alkylammonium salt, benzalkonium salt, alkylpyridinium salt, imidazolinium salt and the like.

Furthermore, particular examples of amphoteric surface active agents include alkyl lauryl dimethyl betaine, alkylglycine, alkyldi-(amino ethyl)glycine, imidazolinium betaine and the like. In addition, particular examples of nonionic surface active agents include polyoxyethylene alkylether, polyoxyethylene alkylallylether, polyoxyethylene polyoxypropylene glycol, glycerin ester, sorbitane ester, sucrose ester, polyoxyethylene ether of glycerin ester, polyoxyethylene ether of sorbitol ester, fatty-acid alknolamide, polyoxyethylene fatty-acid amide, amine oxide, polyoxyethylene alkylamine and the like.

The pigment may be covered by a resin having a hydrophilic base and encapsulated within microcapsules so as to be dispersible in water.

It is possible to employ any known methods to cover a water insoluble pigment by an organic polymer to encapsulate the pigment within the microcapsules. Such known methods include chemical methods, physical methods, physicochemical methods, mechanical methods and the like. More particularly, such known methods include the surface polymerization method, in-situ polymerization method, submerged hardening and coating method, coacervation (phase separation) method, submerged drying method, melting dispersion and cooling method, atmospheric suspension coating method, spray drying method, oxydizing separation method, phase inversion emulsification method and the like.

The surface polymerization method separately dissolves two kinds of monomers or two kinds of reactants in a disperse phase and a continuous phase, and forms a wall layer by reacting the two monomers or reactants at the interface. The in-situ polymerization method generates a reaction by supplying a liquid or gas monomer and a catalyst or, two kinds of reactants from one of the continuous phase nucleus grain sides to form the wall layer. The submerged hardening and coating method makes the drops of the polymer solution, including the core material grains, insoluble within the solution by use of a hardening agent (or setting agent) or the like to form the wall layer.

The coacervation (phase separation) method separates the polymer dispersing agent in which the core material grains are dispersed, into a coacervate phase having a high polymer concentration and a thin (or weak) phase to form the wall layer. The submerged drying method adjusts the disperse solution in which the core material of the wall layer material is dispersed, adds the disperse solution into a solution to which the continuous phase of the disperse solution does not become admixed, so as to form a composite emulsion, and forms the wall layer by gradually removing the medium in which the wall layer material is dissolved.

The melting dispersion and cooling method uses a wall layer material which melts to liquid form when heated and hardens at room temperature, heats and liquefies the wall layer material, disperses the core material grains in the wall layer material liquid as fine grains, and forms the wall layer by cooling. The atmospheric suspension coating method suspends the core material grains of the powder within the atmosphere by use of a fluid bed, spray-mixes a coating liquid of the wall layer material while floating the core material grains within the air current, so as to form the wall layer.

The spray drying method sprays an encapsulating stock solution to make contact with hot air, and forms the wall layer by evaporating and drying the volatile matter. The oxydizing separation method neutralizes at least a portion of the anionic base of the organic polymer compound that includes the anionic base by use of a basic salt compound, so as to make it water soluble and mixes it within a water medium together with a coloring material, thereafter makes it acidic or neutral by use of an acid compound to separate and adhere the organic compound to the coloring material, which is followed by a neutralization and dispersion. The phase inversion emulsification method makes a mixture including anionic organic polymer having dispersivity with respect to water, and a coloring material, as an organic solvent phase, and supplies the organic solvent phase into water or, supplies water to the organic solvent phase.

Particular examples of the organic polymers (resins) that may be used for the material forming the wall layer of the microcapsules include polyamide, polyurethane, polyester, polyurea, epoxy resin, polycarbonate, urea resin, melamine resin, phenol resin, polysaccharide, gelatin, gum Arabic, dextran, casein, protein, natural rubber, carboxypolymethylene, polyvinyl alcohol, polyvinyl pyrrolidone, polyvinyl acetate, polyvinyl chloride, polyvinyl vinylidene, cellulose, ethyl cellulose, methyl cellulose, nitro cellulose, hydroxyethyl cellulose, acetic cellulose, polyethylene, polystyrene, polymer or copolymer of (meta-) acrylic acid, polymer or copolymer of (meta-) acrylic ester, (meta-) acrylic acid-(meta-) acrylic ester copolymer, styrene-(meta-) acrylic acid copolymer, styrene-maleic acid copolymer, alginic acid soda, fatty acid, paraffin, syrup wax, water wax, hardening beef tallow, carnauva wax, albumin and the like.

Of the above organic polymers, it is possible to use organic polymers having an anionic base such as the carbonic acid base and the sulfonic acid base. In addition, examples of the nonionic organic polymers include polyvinyl alcohol, polyethyleneglycol monometacrylate, polypropyleneglycol monometacrylate, methoxypolyethyelene-glycol monometacrylate, polymers or copolymers thereof, cationic ring-opening polymer of 2-oxazoline, and the like. The water solubility of polyvinyl alcohol obtained through complete saponification is particularly poor, and is preferable in that it is easily soluble to hot water but not easily soluble to cold water.

The amount of organic polymer forming the wall layer material of the microcapsules is 1 weight % or greater and 20 weight % or less with respect to the water insoluble coloring material such as carbon black or the organic pigment. By setting the amount of the organic polymer to this range, the organic polymer content within the microcapsules becomes relatively low, thereby making it possible to suppress the deterioration of the coloring (or coupling) of the pigment caused by the organic polymer that covers the pigment surface. When the amount of organic polymer is less than 1 weight %, it is difficult to obtain the effects of encapsulating the pigments by the microcapsules. On the other hand, when the amount of organic polymer is greater than 20 weight %, the deterioration of the coloring (or coupling) of the pigment becomes notable. When other characteristics and the like are also taken into consideration, it is preferable that the amount of organic polymer is in a range of 5 to 10 weight % with respect to the water insoluble coloring material.

In other words, it is possible to suppress the deterioration of the coloring (or coupling) by substantially not covering and hence exposing a portion of the coloring material, and at the same time, it is possible to obtain the effects of covering the pigment by substantially covering and thus not exposing a portion of the coloring material. The number average molecular weight of the organic polymer is preferably 2000 or greater from the point of view of producing the capsules. By "substantially exposed", it means that a portion of the coloring material is intentionally exposed, and does not refer to a partial exposure caused by a pinhole, crack, defect and the like.

When a self-dispersion type organic pigment or self-dispersion type carbon black is used as the coloring material, it is possible to improve the dispersion of the pigment even if the organic polymer content within the microcapsules is relatively low. Hence, such pigments are suitable for use in the present invention in that it is possible to maintain sufficient stability of the ink during storage.

It is preferable to select a suitable organic polymer depending on the method of encapsulating the pigments within the microcapsules. For example, polyester, polyamide, polyurethane, polyvinyl pyrrolidone, epoxy resin and the like are suited for use when employing the surface polymerization method. Polymer or copolymer of (meta-) acrylic ester, (meta-) acrylic acid-(meta-) acrylic ester copolymer, styrene-(meta-) acrylic acid copolymer, polyvinyl chloride, polyvinyl vinylidene, polyamide and the like are suited for use when employing the in-situ polymerization method. Alginic acid soda, polyvinyl alcohol, gelatin, albumin, epoxy resin and the like are suitable for use when employing the submerged hardening and coating method. Gelatin, cellulose, casein and the like are suited for use when employing the coacervation (phase separation) method. In order to obtain pigments that are encapsulated within fine and uniform microcapsules, it is of course possible to use other known encapsulating methods.

Anionic organic polymers are suited for use as the organic polymer forming the wall layer material of the microcapsules when employing the oxidizing separation method or the phase inversion emulsification method. The phase inversion emulsification method makes a compound or complex of anionic organic polymer having self-dispersivity or solubility with respect to water and a coloring material such as an organic coloring material having self-dispersivity or carbon black having self-dispersivity or, a mixture of a coloring material such as an organic pigment having self-dispersivity or carbon black having self-dispersivity, a hardening agent (or setting agent) and anionic organic polymer, as an organic solvent phase, into an organic solvent phase, and supplies the organic solvent phase into water or, supplies water to the organic solvent phase, so as to encapsulate the coloring material by the microcapsules while making the self-dispersion (phase inversion emulsification). When carrying out the phase inversion emulsification method, it is of course possible to mix into the organic solvent an additive such as a vehicle for the ink. From the point of view of producing a dispersion fluid for the direct recording ink, it is preferable to mix a fluid medium of the recording ink.

On the other hand, the oxydizing separation method neutralizes at least a portion (that is, neutralizes a portion or all) of the anionic base of the organic polymer that includes the anionic base by use of a basic salt compound, so as to make it water soluble and mixes it within a water medium together with a coloring material such as an organic pigment having self-dispersibility or carbon black having self-dispersibility, thereafter makes it acidic or pH neutral in by use of an acid compound to separate and adhere the organic polymer that includes the anionic base to the coloring material, to form a hydrous cake. The hydrous cake is then subjected to a neutralization which neutralizes a portion or all of the anionic base using a basic salt compound, to form the microcapsules. As a result, it is possible to produce a water dispersion fluid that includes pigments that are encapsulated by fine anionic microcapsules including a large amount of pigments.

Examples of a solvent that may be used when making the microcapsules described above include alkyl alcohols such as methanol, ethanol, propanol and butanol; aromatic hydrocarbons such as benzole, triole and xylole; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve. The microcapsules may be separated from the solvent by centrifugation, filtering or the like, agitated and redispersed together with water and the necessary solvent, so as to obtain the desired recording ink. Preferably, an average grain diameter of the encapsulated pigment is 50 to 180 nm.

By encapsulating the pigment by the microcapsules, the pigment more positively adheres on the recording medium such as the paper 3, and the scraping resistance of the recorded image on the recording medium is improved.

In order to make the recording ink have a desired property or, to prevent clogging of the nozzles of the recording head 14 due to drying, it is preferable to use a water soluble organic solvent in addition to the coloring material. The water soluble organic solvent includes a wetting agent and a penetrating agent. The wetting agent is added for the purpose of preventing the clogging of the nozzles of the recording head 14 due to drying.

Particular examples of the wetting agent include polyhydric alcohols such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentandiol, 1,6-hexanediol, glycerin, 1,2,6-hexanetriol, 2-ethyl-1,3-hexanediol, 1,2,4-butanetriol, 1,2,3-butanetriol and petriol; polyhydric alcohol alkylethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether and propylene glycol monoethyl ether; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone and ε-caprolactam; amides such as formamide, N-methyl formamide and N,N-dimethyl formamide; amines such as monoethanol amine, diethanol amine, triethanol amine, monoethyl amine, diethyl amine and triethyl amine; sulfur-containing compounds such as dimethyl sulfoxide, sofolane and thiodiethanol; propylene carbonate; ethylene carbonate; γ-butyrolactone and the like. One of such solvents or, a mixture of a plurality of such solvents, are used in combination with water.

The penetrating agent is added to improve the wetting characteristic between the recording ink and the recording medium, and to adjust the penetration rate (or speed). The penetrating agent is preferably represented by one of the formulas (1) through (4) respectively shown in FIGS. 10 through 13.

The polyoxyethylene alkylphenyl ether surface active agent represented by the formula (1) where R is a hydrocarbon chain of carbon numbers 6 to 14 that may branch and k: 5 to 20, the acetylene glycol surface active agent represented by the formula (2) where m, n: 0 to 40, the polyoxyethylene alkyl ether surface active agent represented by the formula (3) where R is a hydrocarbon chain of carbon numbers 6 to 14 that may branch and k: 5 to 20, and the polyoxyethylene polyoxypropylene alkyl ether represented by the formula (4) where R is a hydrocarbon chain of carbon numbers 6 to 14 and m, n: less than or equal to 20, can reduce the surface tension of the ink. As a result, it is possible to improve the wetting characteristic between the recording ink and the recording medium, and to increase the penetration rate (or speed).

Of course, it is possible to use penetrating agents other than the compounds represented by the formulas (1) through (4). Examples of such other penetrating agents include alkyls of polyhydric alcohol and aryl ethers such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether and tetraethlyene glycol chlorophenyl ether; nonionic surface active agents such as polyoxyethylene polyoxypropylene block copolymer; fluoric surface active agents; lower alcohols such as ethanol and 2-propanol; and the like. Of the above, diethylene glycol monobutyl ether is particularly preferable for use as the penetrating agent.

The surface tension of the recording ink is preferably in a range of 20 to 60 $mJ/m^2$. From the point of view of simultaneously achieving a satisfactory wetting characteristic between the recording ink and the recording medium and satisfactory grains of the ink drops, it is further preferable for the surface tension of the recording ink to be in a range of 30 to 50 $mJ/m^2$.

The viscosity of the recording ink is preferably in a range of 1.0 to 20.0 mPa·s at 25° C. And, from the point of view of achieving stable ink ejection from the nozzles, it is further preferable that the viscosity of the recording ink is in a range of 3.0 to 10 mPa·s at 25° C.

The pH of the recording ink is preferably in a range of 3 to 11. From the point of view of preventing corrosion of metal members that make contact with the recording ink, it is further preferable that the pH of the recording ink is in a range of 6 to 10.

The recording ink may include a preservative and fungus repellant. By including the preservative and fungus repellant, it is possible to prevent germ reproduction, and improve the stability of the ink during storage and the picture quality of the image that is recorded on the recording medium. Examples of the preservative and fungus repellant include benzotriazol, dehydrosodium acetate, sodium sorbic acid, 2-pyredinethiol-1-sodium oxide, isothiazolene compound, sodium benzoic acid, sodium pentachlorophenol and the like.

The recording ink may include a rust preventive agent. By including the rust preventive agent, it is possible to form a film on the metal surface that makes contact with the recording ink, such as the recording head 14, so as to prevent the metal surface from rusting. Examples of the rust preventive agent include acid sulfite, sodium thiosulfate, ammonium thioglycolic acid, diisopropyl ammonium nitrite, pentaerythrotol tetranitrate, dicyclohexyl ammonium nitrite and the like.

The recording ink may include an oxidation inhibitor. By including the oxidation inhibitor, the oxidation inhibitor will eliminate radical seeds when the radical seeds that cause the corrosion is generated. Hence, it is possible to prevent corrosion.

Examples of the oxidation inhibitor include phenol compounds such as hydroquinone; compounds of garates; and hindered phenol compounds such as 2,6-di-tert-butyl-p-cresol, stearyl-β-(3,5-di-tert-butyl-4-hydrozyphenyl)propionate, 2,2'-methylene bis(4-ethyl-6-tert-butyl phenol), 2,2'-methylene bis(4-methyl-6-tert-butyl phenol), 4,4'-thio bis(3-methyl-6-tert-butyl phenol), 1,1,3-tris (2-methyl-4-hydroxy-5-tert-butyl phenyl)butane, 1,3,5-trimethyl-2,4,6-tris (3,5-di-tert-4-hydroxy benzyl)benzene, tris (3,5-di-tert-butyl-4-hydroxy benzyl)isocyanrate and tetrakis [methylene-3(3',5'-di-tert-butyl-4-hydroxy phenyl)propionate]methane; and the like.

Examples of the oxidation inhibitor also include amine compounds such as N,N'-diphenyl-p-phenylne diamine, phenyl-β-naphthylamine, phenyl-α-naphthylamine, N,N'-β-naphthyl-p-phenylene diamine, N,N'-diphenyl ethylene diamine, N,N'-di-sec-butyl-p-phenylene diamine, 4,4'-tetramethyl-diaminodiphenyl mathane and the like.

Examples of the oxidation inhibitor also includes sulfur compounds such as dilauryl thiodipropionate, distearyl thiodipropionate, lauryl steryl thiodiproprionate, dimyristyl thiodipropionate, distearyl β,β'-thiodibutylate, 2-mercaptobenzo imidazole, dilauryl sulfide and the like. Furthermore, examples of the oxidation inhibitor also includes phosphorus compounds such as triphenyl phosphite, trioctadecyl phosphite, tridecyl phosphite, trilauryl thiophosphite, diphenyl diodecyl phosphite, trinonyl phenyl phosphite, distearyl pentaerythrythol phosphite and the like.

Furthermore, the recording ink may include a pH regulator. Examples of the pH regulator include hydroxides of alkaline metal elements such as lithium hydroxide, sodium hydroxide and potassium hydroxide; ammonium hydroxide; quaternary ammonium hydroxides; quaternary phosphonium hydroxides; carbonates of alkaline metal elements such as lithium carbonate, sodium carbonate and potassium carbonate; amines such as diethanol amine and triethanol amine; boric acid; hydrochloric acid; sulfuric acid; acetic acid and the like.

Figure 14:
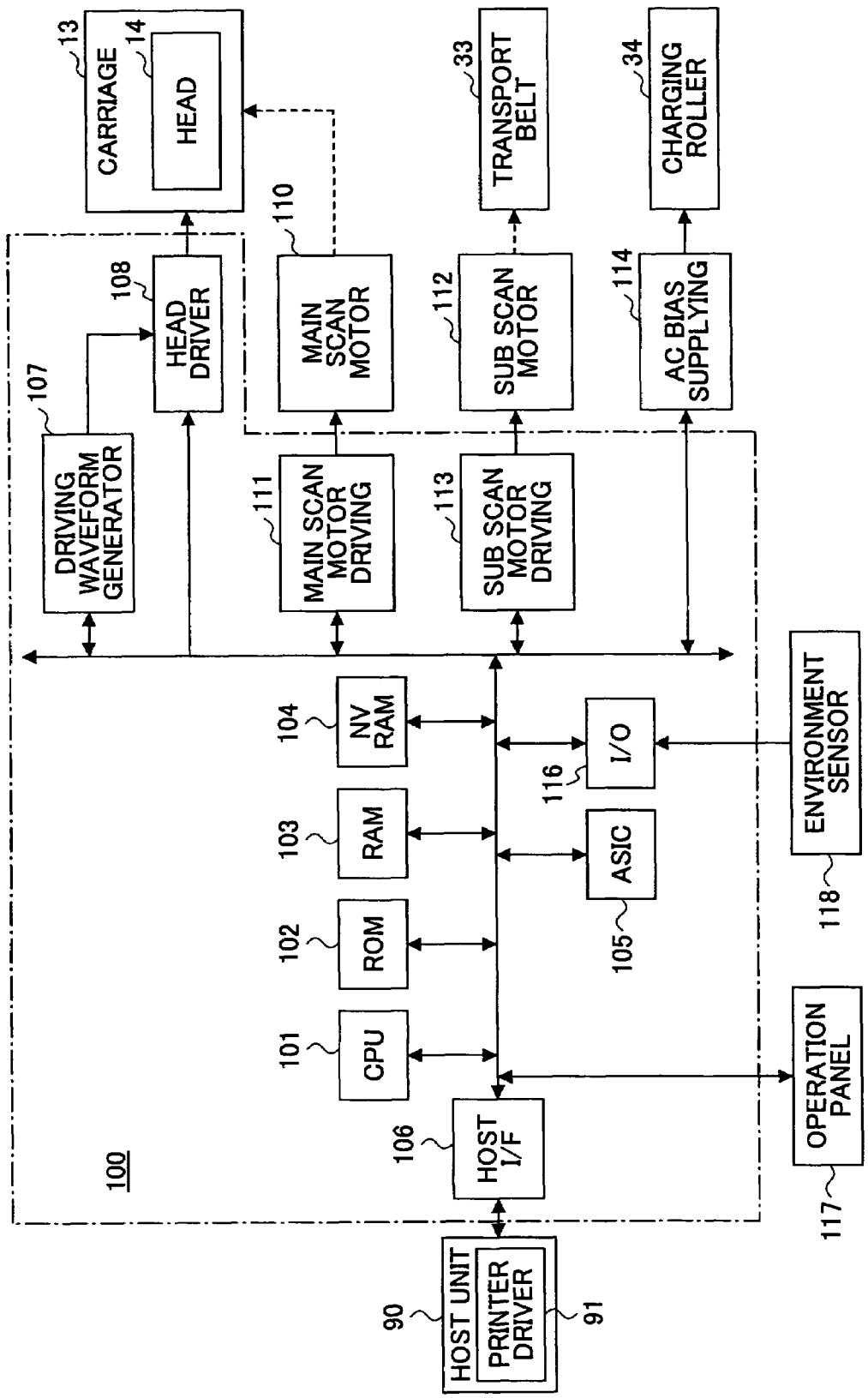
FIG. 14 is a system block diagram showing a control part of the ink-jet recording apparatus.

Next, a description will be given of a control part of the ink-jet recording apparatus, by referring to FIG. 14. FIG. 14 is a system block diagram showing the control part of the ink-jet recording apparatus.

A control part 100 shown in FIG. 14 includes a CPU 101 that controls the entire ink-jet recording apparatus, a ROM 102 that stores programs to be executed by the CPU 101 and other fixed data, a RAM 103 that temporarily stores image data and the like, a non-volatile memory (NVRAM) 104 that hold data even when the power of the ink-jet recording apparatus is OFF, and an ASIC 105 that carries out various kinds of signal processing, image processing such as rearrangement, and other processing including processing of input and output signals for controlling the entire ink-jet recording apparatus.

The control part 100 further includes an interface (I/F) 106, a driving waveform generator 107, a head driver 108, a main scan motor driving part 111 for driving a main scan motor 110, a sub scan motor driving part 113 for driving a sub scan motor 112, an AC bias supplying part 114 for supplying an AC bias to the charging roller 34, an environment sensor (or sensor unit) 118, and an input/output (I/O) part 116. The interface 106 exchanges data and signals between the control part 100 and a host unit 90, such as a personal computer, including the image processing apparatus according to the present invention. The driving waveform generator 107 generates a driving waveform for driving and controlling the recording head 14 via the head driver 108. The environment sensor 118 detects the environment temperature and/or the environment humidity. The input/output part 116 inputs detection signals from various kinds of sensors (not shown) including the environment sensor 118. An operation panel 117 is connected to the control part 100, so as to input and display information that is necessary to the ink-jet recording apparatus.

The control part 100 receives print data and the like, including image data, from the host unit 90, at the interface 106, via a cable or a network. The host unit 90 may be made up of a personal computer or the like, and forms an image processing apparatus such as a data processing apparatus, an image reading apparatus such as an image scanner, and an image pickup apparatus such as a digital camera. The print data with respect to the control part 100 is generated by a printer driver 91 according to the present invention of the host unit 90.

The CPU 101 reads and analyzes the print data within a reception buffer that is included in the interface 106, and after carrying out a data rearranging process and the like in the ASIC 105, transfers the imager data to a head driving control part that is formed by the driving waveform generator 107 and the head driver 108. The conversion of the print data to the bit-map data for the purpose of outputting the image is carried out by the printer driver 91 which develops the print data into the bit-map data and transfers the print data (bit-map data) from the host unit 90 to the control part 100. However, it is of course possible to store font data in the ROM 102, for example.

The driving waveform generator 107 includes a digital-to-analog converter (DAC) for subjecting the pattern data of the driving pulses to a digital-to-analog conversion and outputting with respect to the head driver 108 a driving waveform that is made up of a single driving pulse (driving signal) or a plurality of driving pulses (driving signals).

The head driver 108 drives the recording head 14 by selectively applying the driving pulses forming the driving waveform that is received from the waveform generator 107 to the pressure generating means of the recording head 14, based on the serially input image data (dot pattern data) amounting to 1 line of the recording head 14. For example, the head driver 108 includes a shift register for inputting a clock signal and the serial data, a latch circuit for latching the register value of the shift register in response to a latch signal, a level converting circuit (or level shifter) for converting a level of the output value of the latch circuit, an analog switch array (or switching means) that is controlled to turn ON/OFF by the level converting circuit, and the like. In this case, the recording head 14 can be driven by selectively applying a predetermined driving waveform included in the driving waveform from the driving waveform generator 107 to the pressure generating means of the recording head 14, by controlling the ON/OFF state of the analog switch array. In this embodiment, the driving waveform is made up of a plurality of driving pulses, and one or a plurality of driving pulses are applied to the pressure generating means of the recording head 14 so that the recording head 14 outputs a large ink drop, a medium ink drop, a small ink drop or no ink drop, in order to reproduce 4 kinds of gradation levels.

The image forming system according to the present invention is formed by the host unit 90 (image processing apparatus) that executes the image processing method according to the present invention, and the ink-jet recording apparatus that forms the image forming apparatus according to the present invention.

A description will now be given of the two-way color difference that occurs in the image forming apparatus. The "two-way color difference" refers to the color difference that occurs due to a slight difference between the color tones for the recording in the forward path (or down-path path) and the return path (or up-path) of the recording head scan in the main scanning direction for the two-way recording, because the order in which the recording inks are overlapped is different for the forward path and the return path.

Figure 15:
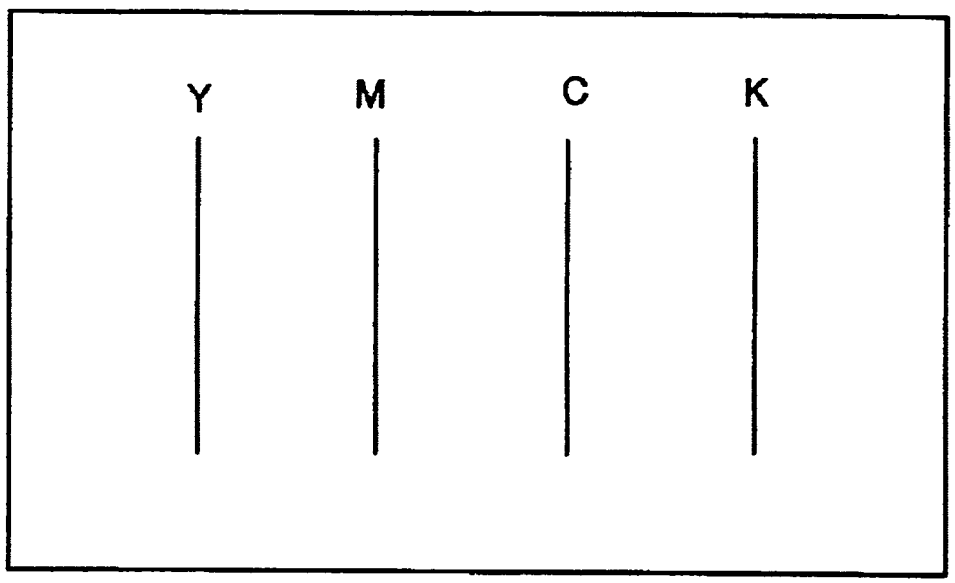
FIG. 15 is a diagram for explaining a head structure and a two-way color difference generated thereby.

For example, when the two-way recording is carried out by use of the recording head 14 shown in FIG. 15 having a row of nozzles arranged in the sub scanning direction (that is, the recording direction) for each of the colors, in the order YMCK, the two-way color difference occurs at the part where a plurality of recording inks overlap on the paper 3. FIG. 15 is a diagram for explaining the head structure and the two-way color difference generated thereby. When the yellow (Y) ink and the cyan (C) ink overlap, the color tone becomes different between the case where the recording is made using the yellow ink and the cyan ink in this order and the case where the recording is made using the cyan ink and the yellow ink in this order. Hence, when the two-way recording is carried out using the recording head 14 shown in FIG. 15, the recording is made using the yellow ink and the cyan ink in this order in the forward path of the recording head scan and using the cyan ink and the yellow ink in this order in the return path in the return path of the recording head scan, and a band-shaped blur (uneven color), that is, the two-way color difference, is generated because of the different color tones for the forward and return paths.

In order to eliminate the two-way color difference, a head structure may be designed to include a plurality of rows of nozzles arranged in the main scanning direction, where each row is made up of a plurality of nozzles that are arranged in the sub scanning direction, two or more rows of nozzles are provided to eject the same color ink, and at least one row of nozzles for ejecting a different color ink is arranged between two rows of nozzles for ejecting the same color ink.

Figure 16:
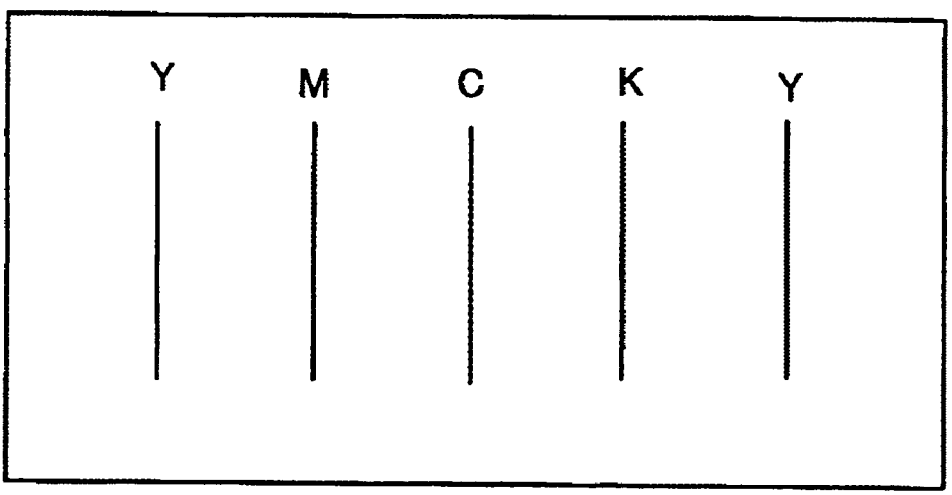
FIG. 16 is a diagram for explaining a head structure for eliminating the two-way color difference.

FIG. 16 is a diagram for explaining a head structure for eliminating the two-way color difference. As shown in FIG. 16, the rows of nozzles for ejecting the cyan ink and the magenta ink are provided between the rows of nozzles for ejecting the yellow ink, so that the recording is made using the cyan ink and the yellow ink in this order or, using the yellow ink and the cyan ink in this order, for both the forward path and the return path of the recording head scan. Further, the recording can also be made using the magenta ink and the yellow ink in this order or, using the yellow ink and the magenta ink in this order, for both the forward path and the return path of the recording head scan. As a result, the two-way recording can be carried out while enlarging the color reproducible region, and a color recording having a large color reproducible region can be carried out at a high speed.

In order to eliminate the two-way color difference, a head structure may be designed to include a plurality of rows of nozzles arranged in the main scanning direction, where each row is made up of a plurality of nozzles that are arranged in the sub scanning direction, two or more rows of nozzles are provided to eject the same color ink, at least one row of nozzles for ejecting a different color ink is arranged between two rows of nozzles for ejecting the same color ink, and the rows of nozzles for ejecting the same color ink are arranged symmetrically to the right and left about a center axis which is perpendicular to the main scanning direction.

Figure 17:
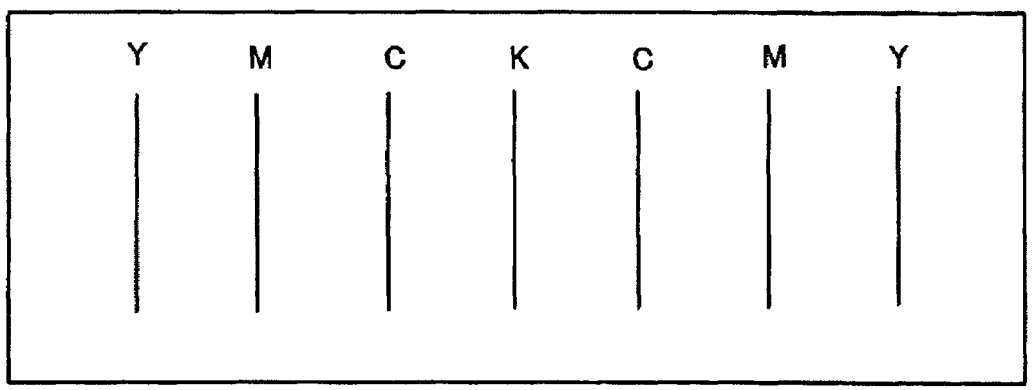
FIG. 17 is a diagram for explaining another head structure for eliminating the two-way color difference.

FIG. 17 is a diagram for explaining another head structure for eliminating the two-way color difference. As shown in FIG. 17, the rows of nozzles for ejecting the same color ink are arranged symmetrically to the right and left about a center axis which is perpendicular to the main scanning direction. More particularly, the rows of nozzles for ejecting the cyan, magenta and yellow inks are arranged symmetrically to the right and left about the center axis which is perpendicular to the main scanning direction, that is, symmetrically to the right and left of the row of nozzles for ejecting the black ink in this particular case. Hence, two or more different color inks may be overlapped in an arbitrary order that is desired, for both the forward path and the return path of the recording head scan, with respect to a larger number of colors. As a result, the two-way recording can be carried out while further enlarging the color reproducible region, and a color recording having a larger color reproducible region can be carried out at a high speed.

Figure 18:
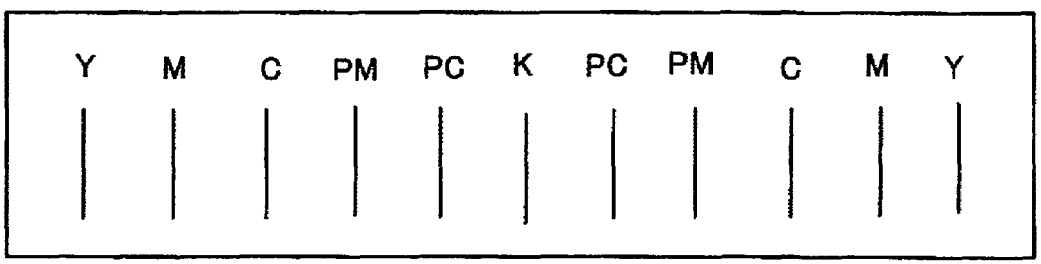
FIG. 18 is a diagram for explaining still another head structure for eliminating the two-way color difference.

FIG. 18 is a diagram for explaining still another head structure for eliminating the two-way color difference. As shown in FIG. 18, the recording head 14 may use yellow, magenta and cyan inks that have lower color tones, namely, photo yellow (PY), photo magenta (PM) and photo cyan (PC) inks, in addition to the normal yellow (Y), magenta (M), cyan (C) and black (B) inks. The symmetrical arrangement of the rows of nozzles for ejecting the different color inks in FIG. 18 is similar to that shown in FIG. 17. Of course, it is possible to additionally use a photo gray (PG) ink. Accordingly, by use of the inks having the lower color tones, the two-way recording can be carried out while further enlarging the color reproducible region, and the granular impression (or rough impression) of the recorded image on the paper 3 can be suppressed.

Figure 19:
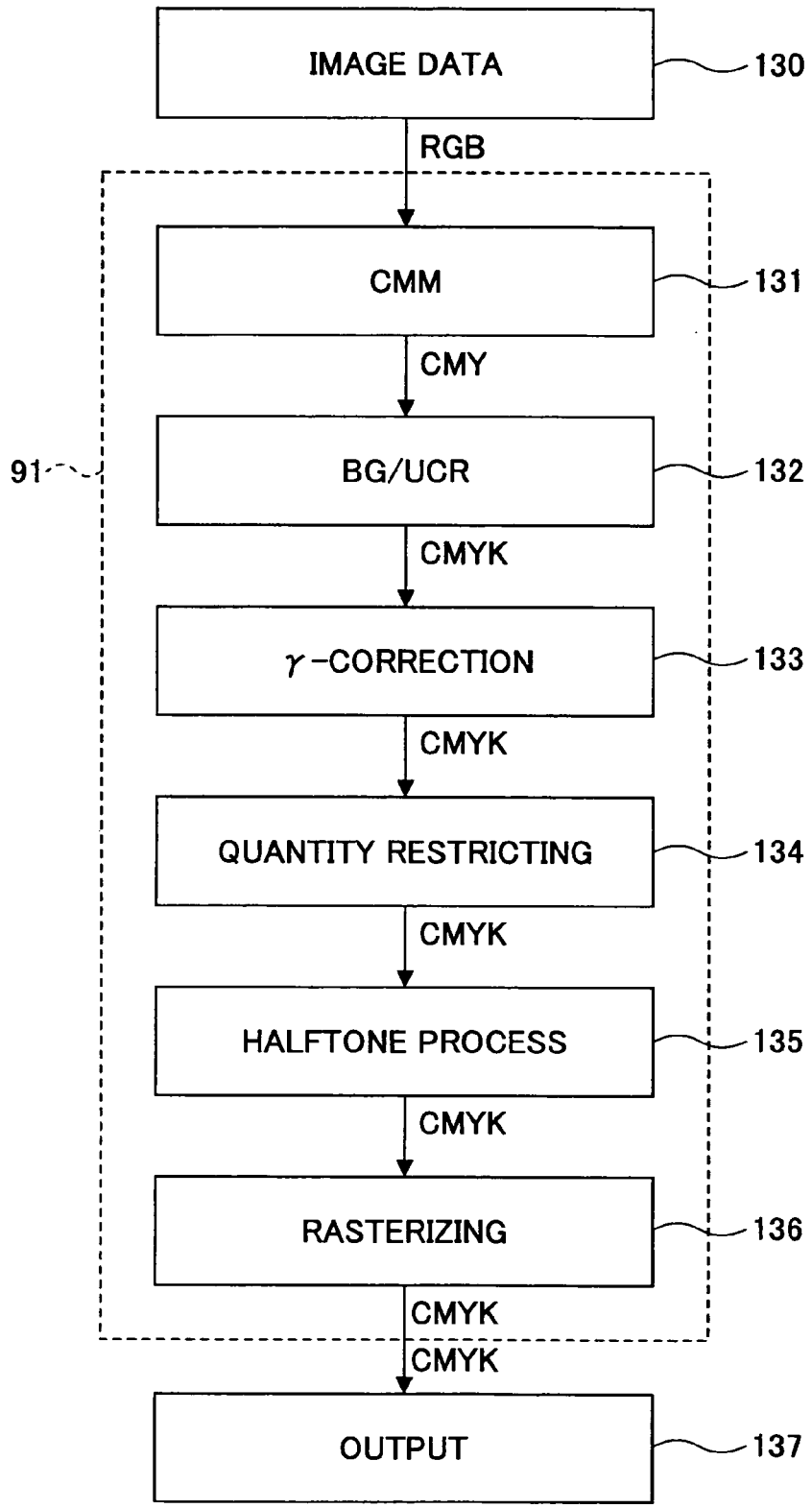
FIG. 19 is a functional block diagram for explaining a structure of an embodiment of a printer driver according to the present invention in an embodiment of an image processing apparatus according to the present invention.

Next, a description will be given of an embodiment of the image processing apparatus (data processing apparatus) according to the present invention which includes the embodiment of the printer driver 91 according to the present invention in the host unit 90 which transfers the image data (print data) to the embodiment of the image forming apparatus according to the present invention, that is, the ink-jet recording apparatus, so as to record (or form) the image by the ink-jet recording apparatus (or image forming apparatus), by referring to FIG. 19. FIG. 19 is a functional block diagram for explaining a structure of this embodiment of the printer driver 91 according to the present invention in this embodiment of the image processing apparatus according to the present invention.

The printer driver 91 of the host unit 90 includes parts 131 through 137 shown in FIG. 19, and processes image data 130 into output image data 137. The color management module (CMM) processing part 131 transforms the image data 130 obtained from an application software or the like from a color space for the monitoring display into a color space for the recording apparatus, to make a transformation from an RGB calorimetric system into a CMY calorimetric system. The black generation/under color removal (BG/UCR) processing part 132 carries out a black generation and an under color removal based on the CMY value. The γ-correction part 133 carries out an input and output correction which reflects the characteristics of the recording apparatus and the preferences of the user. The quantity restricting part 134 restricts the total quantity of data. A halftone processing part 135 includes a dither matrix and replaces the image data by a dot pattern arrangement that is to be output and recorded by the recording apparatus. The rasterizing part 136 divides (or segments) the dot pattern data into data for every scan, and develops the data depending on the positions of each of the nozzles that are to eject the ink and make the recording. An output of the rasterizing part 136 is supplied to the ink-jet recording apparatus as the image data 137.

Of course, a portion or all of the functions of the printer driver 91 may be provided within the ink-jet recording apparatus, that is, the image forming apparatus. The embodiment of the image forming apparatus according to the present invention may be formed by providing the functions of the halftone processing part 135 within the ink-jet recording apparatus (image forming apparatus).

Figure 20:
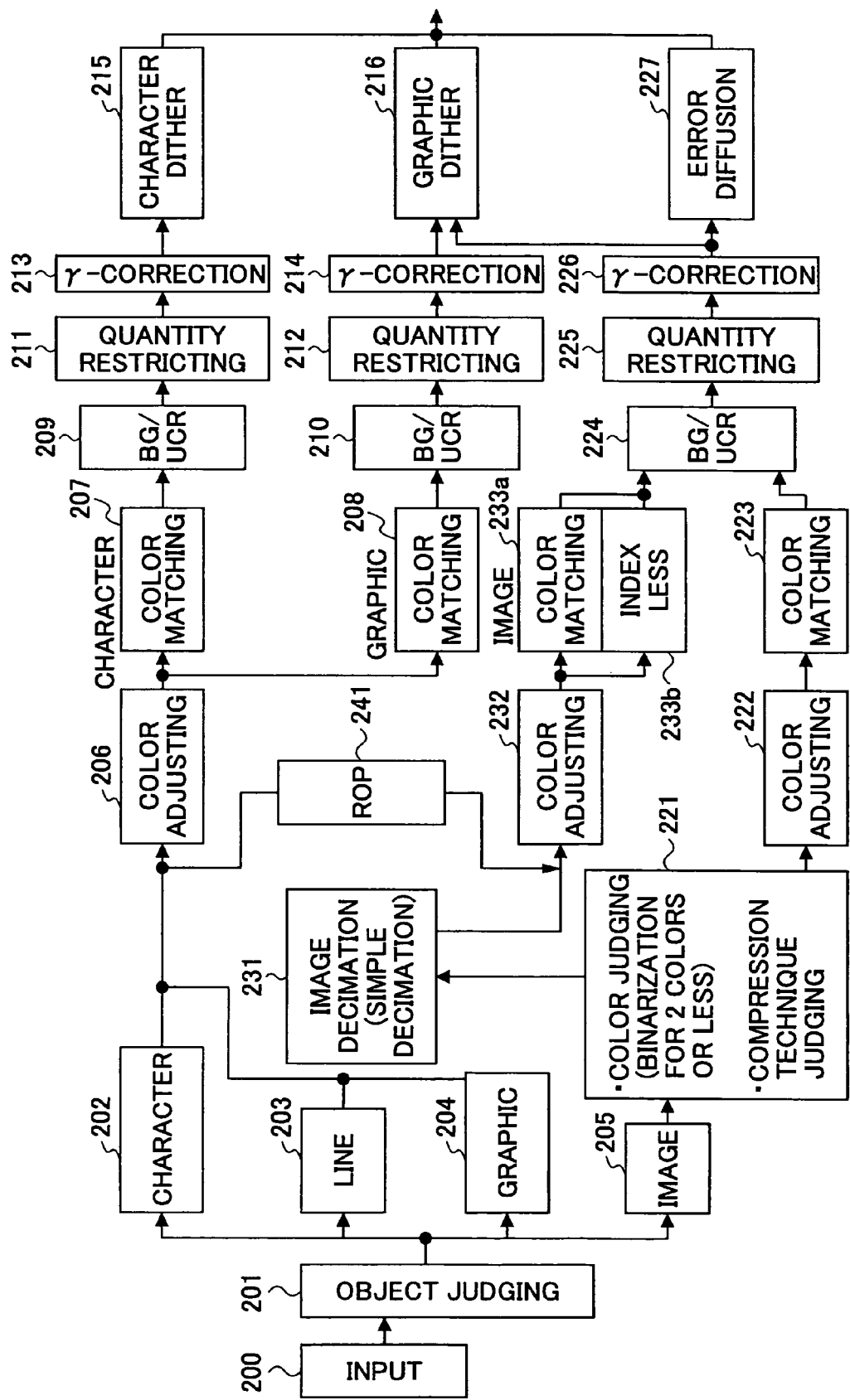
FIG. 20 is a system block diagram for explaining in detail a flow of an image processing within the printer driver.

Next, a description will be given of a flow of the image processing of the printer driver 91 in the host unit 90, up to the halftone process, by referring to FIG. 20. FIG. 20 is a system block diagram for explaining in detail the flow of the image processing within the printer driver 91.

When a "print" instruction is issued from an application software that operates in the data processing apparatus such as the personal computer, an object judging part 201 of the printer driver 91 judges the kind of object with respect to an input 200, and the data are processed through corresponding routes for each judged object. In other words, based on the kind of object judged by the object judging process of the object judging part 201, character image data (hereinafter referred to as character data) 202, line image data (hereinafter referred to as line data) 203, graphic image data (hereinafter referred to as graphic data) 204 and picture image data (hereinafter referred to as image data) 205 are processed through the corresponding routes described hereunder.

More particularly, a color adjusting part 206 carries out a color adjusting process with respect to the character data 202, the line data 203 and the graphic data 204. A color matching process, a BG/UCR process, a quantity restricting process, a γ-correction process and a character dither process (halftone process) are respectively carried out by a color matching part 207, a BG/UCR process part 209, a quantity restricting part 211, a γ-correction part 213 and a character dither process (halftone process) part 215, with respect to the character data 202. In addition, a color matching part 208, a BG/UCR process part 210, a quantity restricting part 212, a γ-correction part 214 and a graphic dither process (halftone process) part 216 respectively carry out a color matching process, a BG/UCR process, a quantity restricting process, a γ-correction process and a graphic dither process (halftone process) with respect to the line data 203 and the graphic data 204.

On the other hand, a color judging and compression technique judging part 221 carries out a color judging and compression technique judging process with respect to the image data 205. Normally, a color adjusting process and a color matching process are carried out by a color adjusting part 222 and a color matching part 223, and a GB/UCR process, a quantity restricting process and a γ-correction process are respectively carried out thereafter by a BG/UCR process part 224, a quantity restricting part 225 and a γ-correction part 226, and then an error diffusion process (halftone process) is carried out by an error diffusion process (halftone process) part 227. In addition, in the case of the recording using two colors or less, an image decimating (or thinning) process, a color adjusting process and a color matching process 233a or an indexless (or no-index) process (process that does not carry out a color matching process) 233b are respectively carried out by an image decimating (or thinning) part 231, a color adjusting part 232 and a color matching part 233a or an indexless process part 233b, the BG/UCR process, the quantity restricting process and the γ-correction process are respectively carried out thereafter by the BG/UCR process part 224, the quantity restricting part 225 and the γ-correction part 226, and then the error diffusion process (halftone process) is carried out by the error diffusion process (halftone process) part 227.

In the case of the line data 203 and the graphic data 204, the process may branch to an ROP process of an ROP process part 241 prior to reaching the color adjusting process of the color adjusting part 206, and then continue to the color matching process of the color matching part 232.

The image data that are processed for each of the objects are finally combined back to the original image data.

The halftone process carried out in the halftone process part describe above corresponds to the embodiment of the image processing method according to the present invention. This embodiment of the image processing method is characterized by a dither mask (threshold matrix) that is used when the dither method is employed for the halftone representation means.

First, a description will be given of the conventional dither mask. As described in the Japanese Laid-Open Patent Application No.2004-166163 referred above, the conventional mask is based on the inclined 45-degree line-group keytone, and has a highpass filter characteristic by taking into consideration the characteristics of the human vision while maintaining the keytone continuity in all gradation levels.

Figure 21:
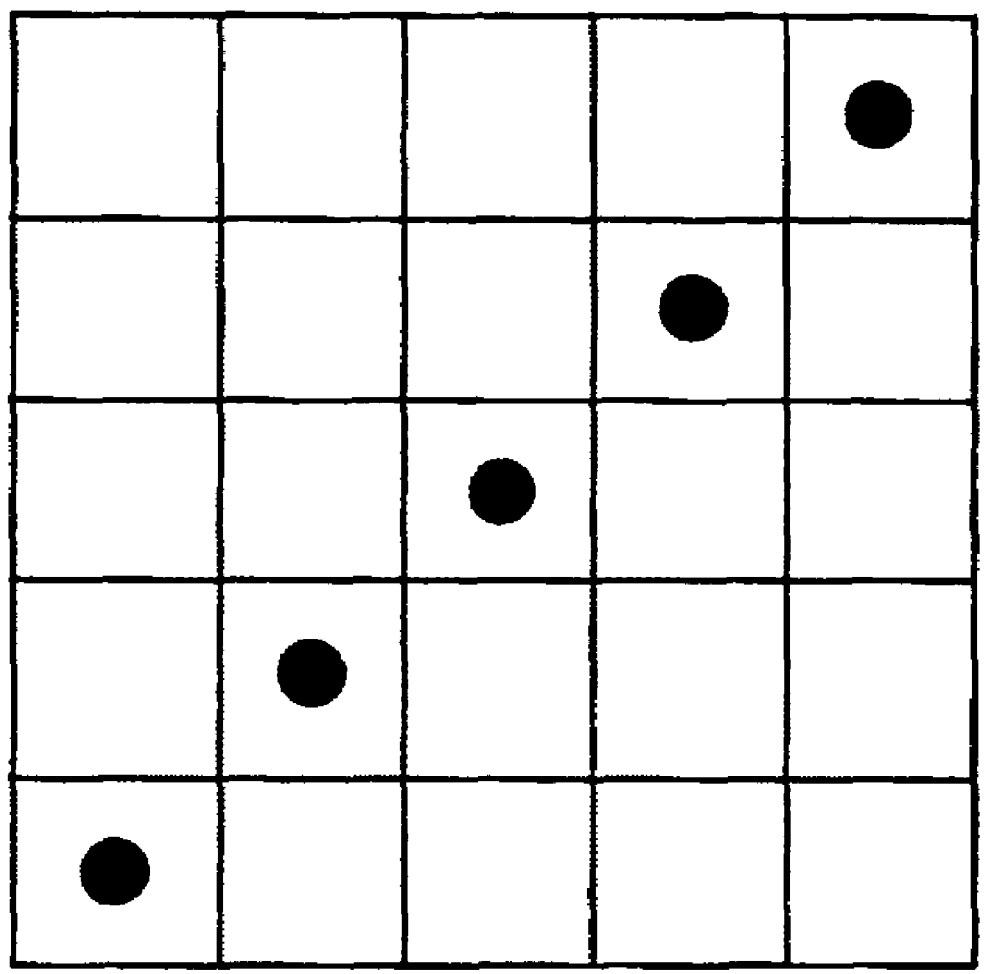
FIG. 21 is a diagram showing an example of a minimum unit pattern of an inclined line-group keytone.
Figure 22:
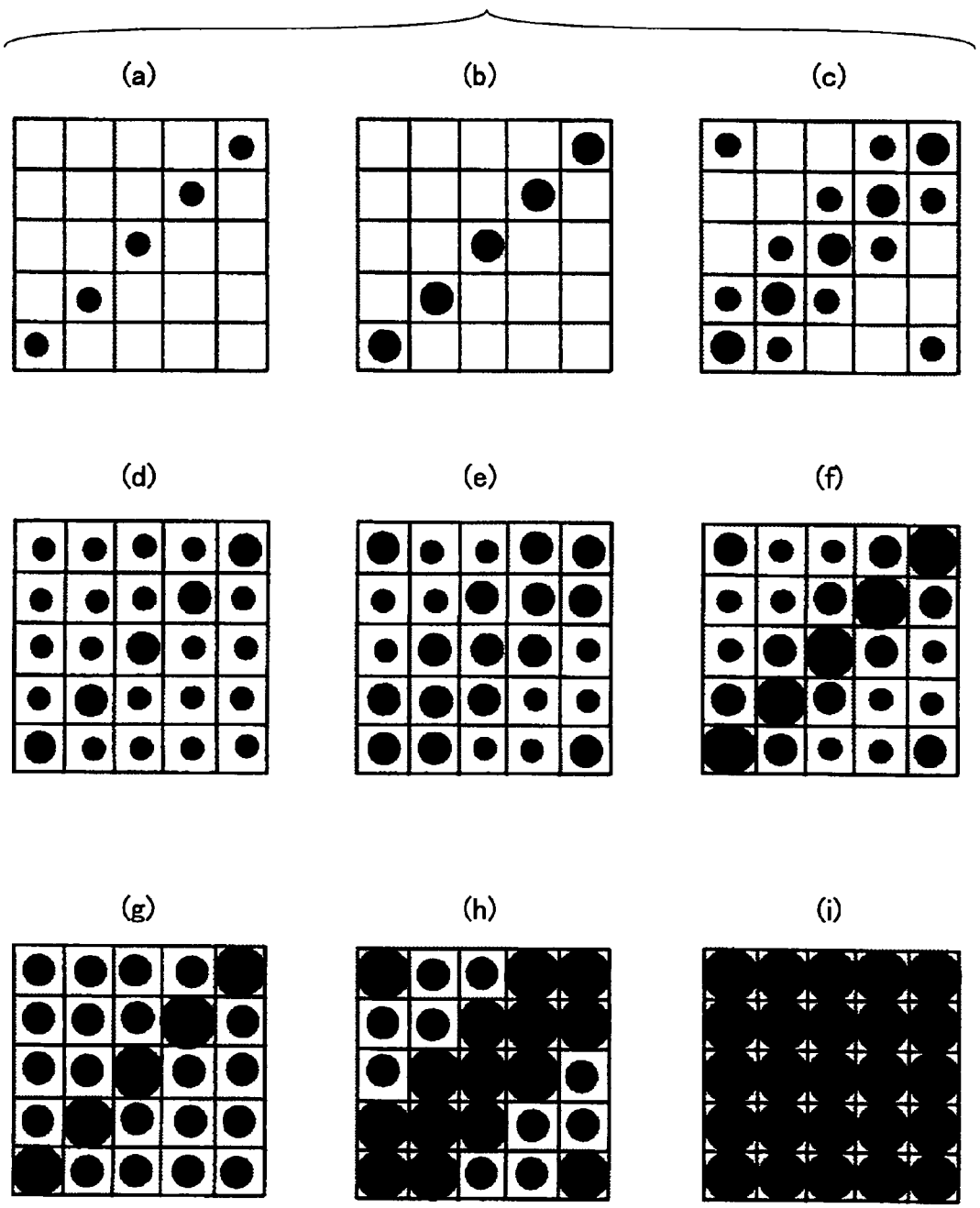
FIG. 22 is a diagram showing gradation representations of the inclined line-group keytone.

FIG. 21 is a diagram showing an example of a minimum unit pattern of the inclined line-group keytone. A 45-degree inclined line-group keytone dither mask will be described by referring to a mask (unit mask) shown in FIG. 21 in which the keytone line appears for every 5 dots for the 5×5 size. Of course, the unit mask may have a 4×4 size, a 3×3 size or, other sizes. The gradation representation is made by gradually fattening the keytone line of the unit mask, as shown in (a) through (i) in FIG. 22. FIG. 22 is a diagram showing the gradation representations of the inclined line-group keytone. In this particular case, it is assumed for the sake of convenience that the dot is formed by one of three kinds of ink drop sizes, namely, a large ink drop, a medium ink drop and a small ink drop. In the following description, the dot arrangement that emphasizes the keytone as shown in (a) through (i) of FIG. 22 will be referred to as a "reference pattern".

In FIG. 22, a reference pattern A shown in (a) has small dots arranged along one diagonal line, a reference pattern B shown in (b) has medium dots arranged along one diagonal line, a reference pattern C shown in (c) has small dots arranged on the right and left of the reference pattern B. In addition, in FIG. 22, a reference pattern D shown in (d) has small dots arranged in all blank portions of the reference pattern C, a reference pattern E shown in (e) has medium dots arranged on the right and left of the reference pattern D, and a reference pattern F shown in (f) has large dots in place of the medium dots that are arranged along the diagonal line of the reference pattern E. Furthermore, in FIG. 22, a reference pattern G shown in (g) has medium dots in place of all of the small dots of the reference pattern F, a reference pattern H shown in (h) has large dots arranged on the right and left of the large dots of the reference pattern G, and a reference pattern I shown in (i) has large dots arranged at all portions.

The number of gradation levels that can be represented by the 5×5 unit mask or a unit mask of a similar size is limited. For example, in order to represent 256 gradation levels by a binary value (with or without dots), it is necessary to use at least a mask size of 16×16. In order to represent 256 gradation levels by a quaternary value (without dot, small dot, medium dot and large dot), it is necessary to use at least a mask size of 8×8.

Figure 23:
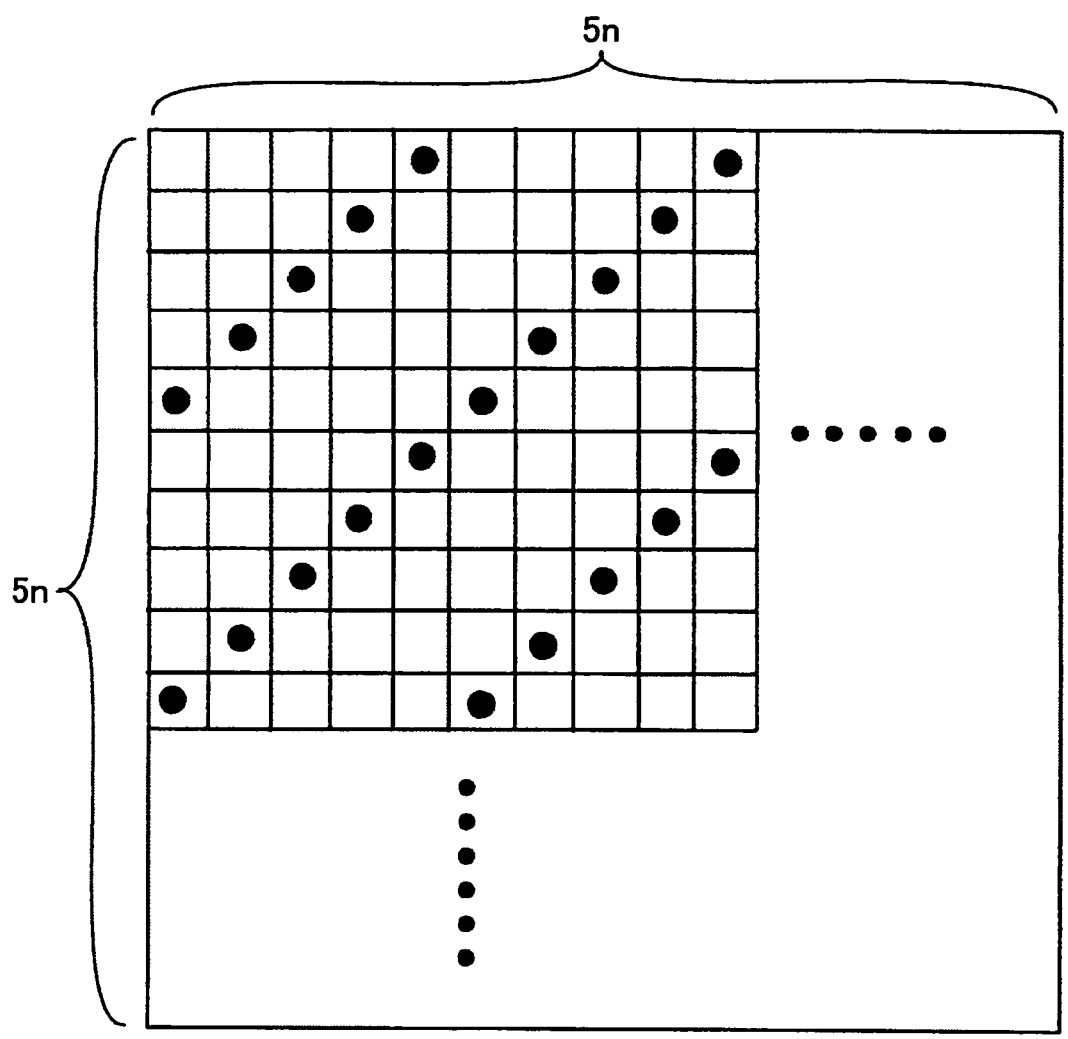
FIG. 23 is a diagram for explaining an example of a dither mask size.
Figure 24:
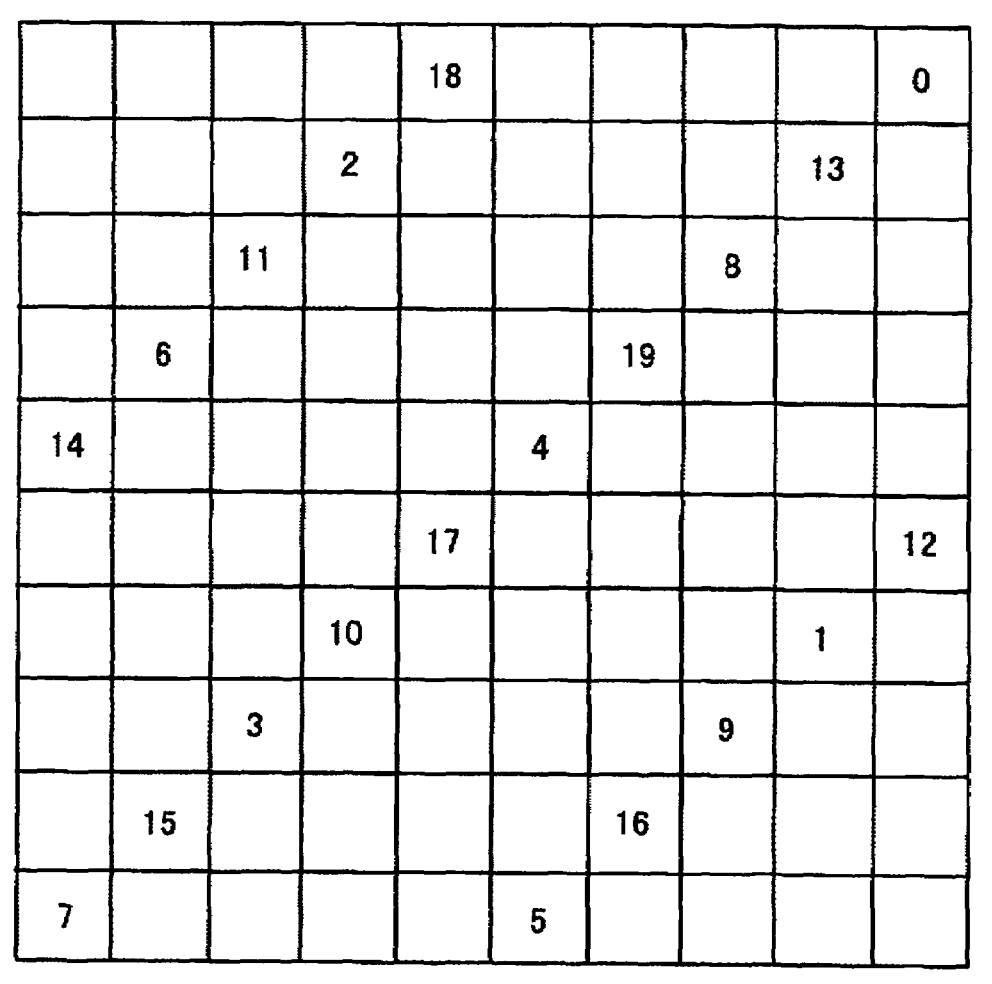

For this reason, the gradation representation is actually made by distributively determining the dot arrangement using a 5n×5 threshold value mask shown in FIG. 23 that is obtained by spreading the 5×5 unit mask which is used as the minimum unit, where n is an arbitrary integer. FIG. 23 is a diagram for explaining an example of the dither mask size, and FIG. 24 is a diagram showing an example of the conventional dither matrix (threshold value matrix). FIG. 24 shows the dot generating order for a 15×15 dither mask, that is, for a case where n=3. Actually, however, an even large mask size is used in order to suppress the texture.

In the case of the dither mask (or matrix) shown in FIG. 24, the keytone pattern is the gradation level that is most emphasized, of all of the gradation levels that can be represented by the ink-jet recording apparatus of this embodiment. For the halftone gradation levels, the gradation level is represented by gradually increasing the dots on the keytone line. In the case of the reference patterns A and B shown in (a) and (b) of FIG. 22, for example, the keytone pattern is emphasized by preferentially arranging the small and medium dots at the 45-degree inclined positions within the 5×5 minimum unit mask. In the case of the reference pattern C shown in (c) of FIG. 22, the keytone line that is already formed by the medium dots is fixed, and the keytone pattern is fattened by preferentially arranging the small dots on both sides of the keytone line. The dots are arranged similarly for the other reference patterns to represent the higher gradation levels.

Figure 25:
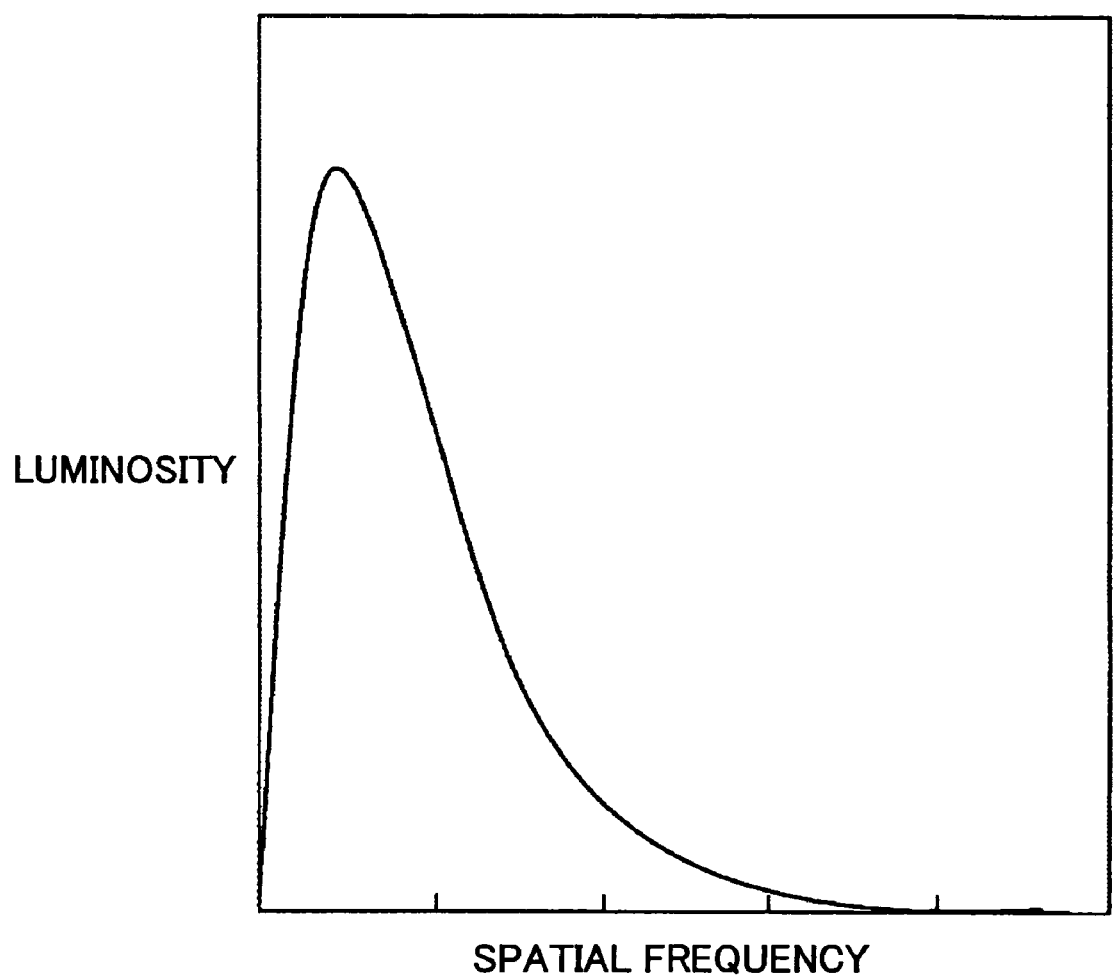
FIG. 25 is a diagram showing a characteristic of the human vision.

When making the gradation representation, it is necessary to determine the dot arrangement order to interpolate (or compensate) between the reference patterns. In making this determination, measures are taken so that the dot arrangement has a highpass filter characteristic which takes into consideration the characteristic of the human vision (VTF) shown in FIG. 25. FIG. 25 is a diagram showing the characteristic of the human vision. In FIG. 25, the ordinate indicates the luminosity in arbitrary units, and the abscissa indicates the spatial frequency in arbitrary units.

Figure 26A:
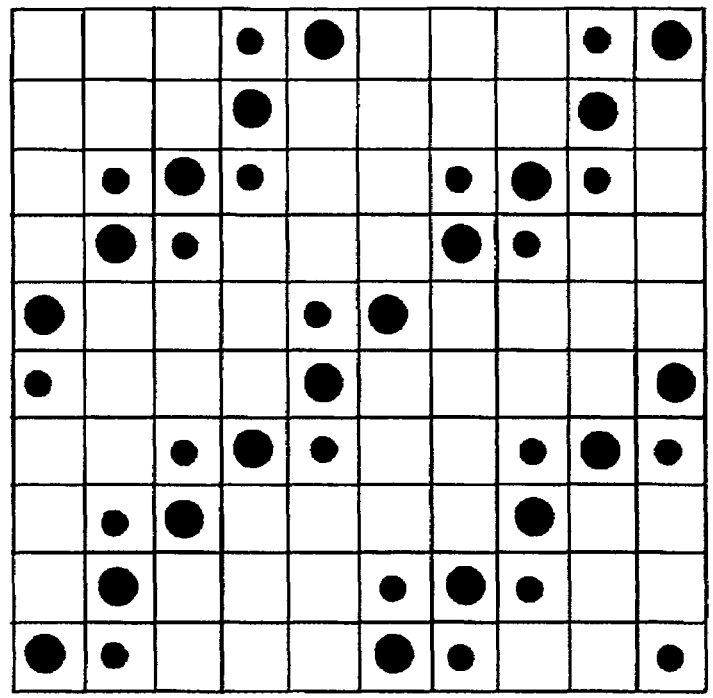
FIGS. 26A and 26B respectively are diagrams for explaining dot arrangements of halftone gradation levels between patterns having emphasized inclined line-group keytone.
Figure 26B:
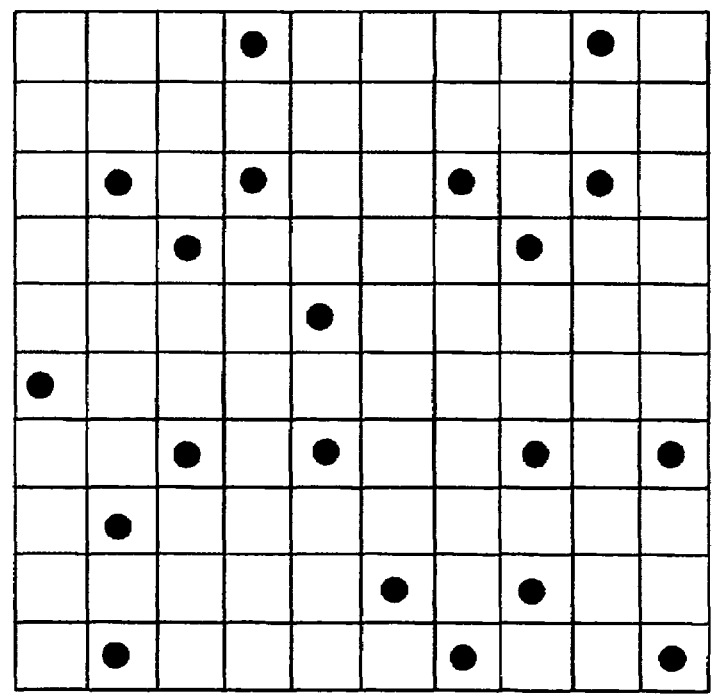

FIGS. 26A and 26B respectively are diagrams for explaining dot arrangements of halftone gradation levels between patterns having emphasized inclined line-group keytone, for a case where the gradation level changes from the gradation level represented by the reference pattern B shown in (b) of FIG. 22 to the gradation level represented by the reference pattern C shown in (c) of FIG. 22. FIG. 26A shows the dot pattern for the halftone gradation level when the change is made from the reference pattern B to the reference pattern C, and a dot pattern having a highpass characteristic shown in FIG. 26B is obtained when the keytone lines are removed from the dot pattern shown in FIG. 26A.

Figure 27:
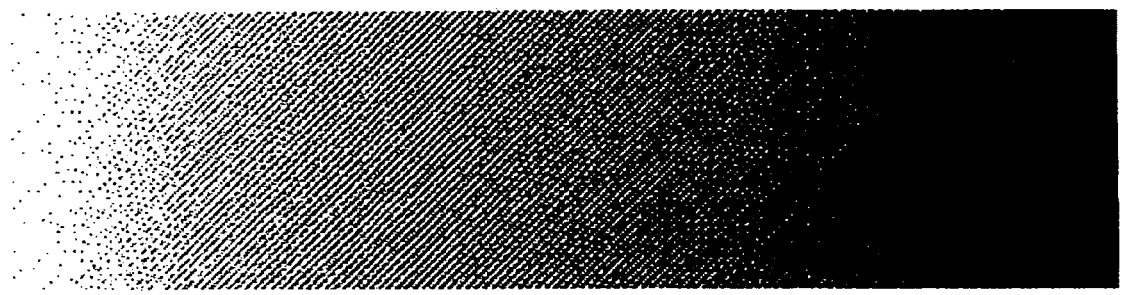
FIG. 27 is a diagram showing a gradation pattern obtained by the conventional group-line keytone.

FIG. 27 is a diagram showing a gradation pattern obtained using the dither mask described above, that is, by the conventional group-line keytone.

The continuity of the inclined line-group keytone is maintained for all gradation levels of the dither pattern described above, thereby making the banding and the like inconspicuous. Therefore, by using the dither mask that is formed by the patterns (reference patterns) having the plurality of different gradation values depending on the dot combinations that can be recognized as the inclined line-group keytone pattern, and the patterns that interpolate the reference patterns so as to obtain linear gradation values, the continuity of the inclined line-group keytone is maintained and the banding and the like become inconspicuous.

However, a problem occurs when the two-way impact error described above is generated. In other words, when the image is formed in an environment in which the two-way impact error occurs, the granular impression (or rough impression) of the recorded image on the paper 3 becomes more conspicuous due to the error in the dot position relative to the target position, and it may become impossible to form the keytone line, to thereby deteriorate the picture quality of the recorded image.

Figure 28:
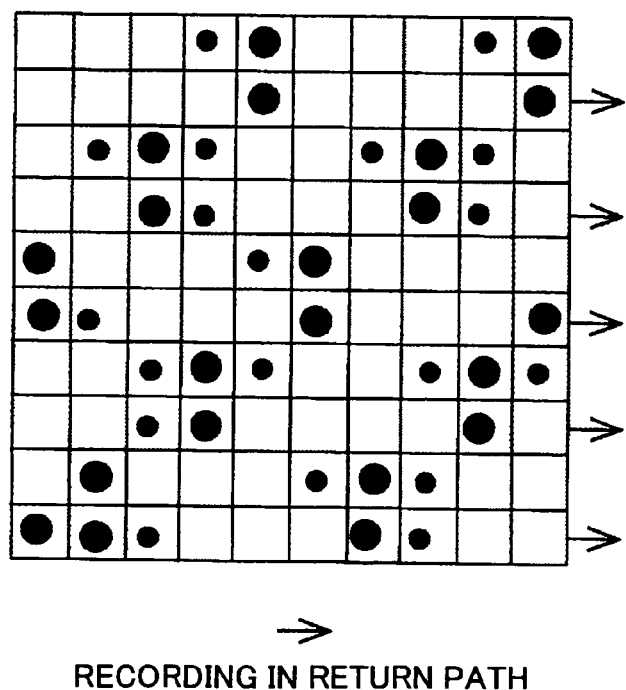
FIG. 28 is a diagram for explaining the dot arrangement for a case where a two-way impact error occurs even though the dot arrangement shown in FIG. 26A should ideally be obtained.

For example, even if the dot pattern shown in FIG. 26A should be obtained ideally, the dot position error may occur for every other line as shown in FIG. 28, and the keytone may change to another type of keytone. FIG. 28 is a diagram for explaining the dot arrangement for a case where a two-way impact error occurs even though the dot arrangement shown in FIG. 26A should ideally be obtained. FIG. 28 is a diagram for explaining the dot arrangement for the case where the two-way impact error occurs even though the dot arrangement shown in FIG. 26A should ideally be obtained. When different keytones coexist, it no longer becomes possible to maintain the continuity of the keytone. FIG. 28 shows a case where an error of 1 dot (1-dot shift) in the rightward direction occurs for every other line for the forward path of the recording head scan in the main scanning direction, for example. It may be seen from FIG. 28 that another keytone which intersects the original keytone pattern is generated.

Hence, the image processing method of the present invention uses a dither mask that completes the keytone at a stage when the recording in the forward path of the recording head scan is made, in order to carry out a halftone process that generates a conspicuous keytone at the stage when the recording in the forward path of the recording head scan is made. A description will now be given of the dot arrangement order for the halftone gradation level that interpolates between the reference patterns shown in FIG. 22.

Conventionally, the dot arrangement order is determined by the entire mask as shown in FIG. 24. On the other hand, in the present invention, the dither mask is divided into divided masks depending on the state of the impact error, and the dot arrangement order is determined for each divided mask. Hence, when the two-way impact error occurs, the dither mask is divided into a divided mask of the odd lines (recording in the forward path) and a divided mask of the even lines (recording in the return path), and a combined dither mask of the two divided masks is used.

Figure 29:
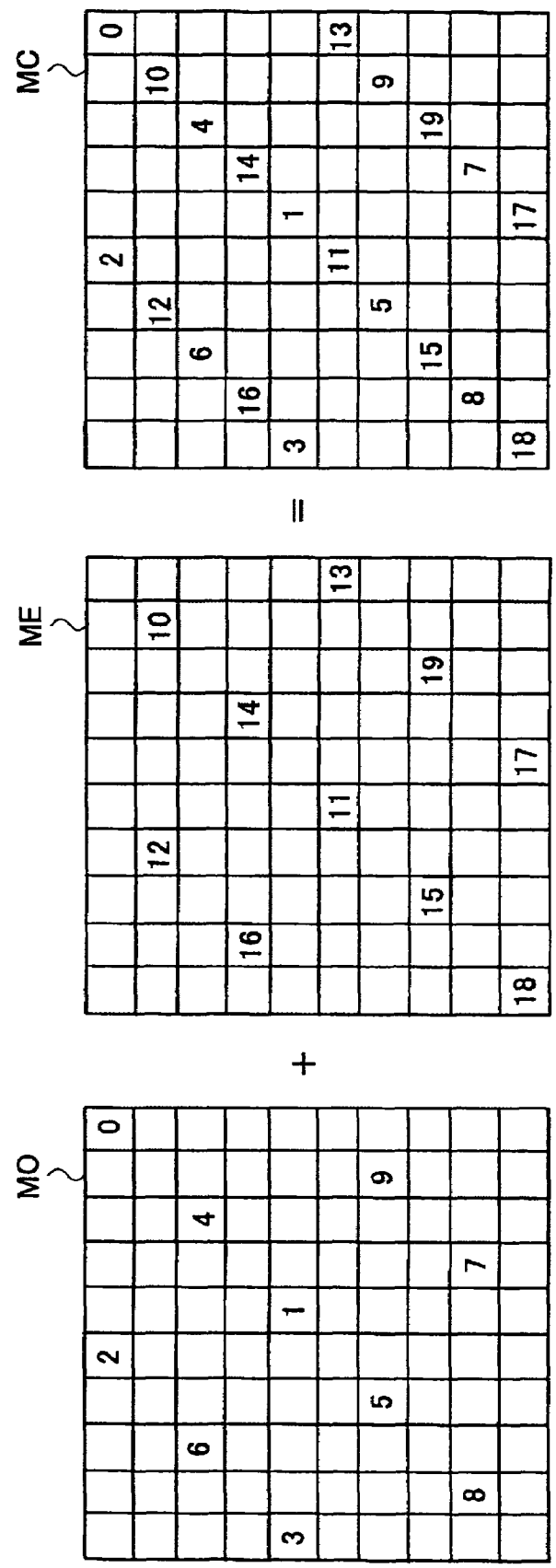
FIG. 29 is a diagram showing a dither matrix (threshold value matrix) used in the present invention.

For example, in the case of the dither matrix (threshold value matrix) shown in FIG. 24, the dither mask is divided into a divided mask (forward path mask) MO of the odd lines (recording in the forward path) and a divided mask (return path mask) ME of the even lines (recording in the return path) shown in FIG. 29, and a combined dither mask MC of the two divided masks MO and ME is used. FIG. 29 is a diagram showing the dither matrix (threshold value matrix) used in the present invention.

In other words, the dot arrangement order is such that the dots are first formed by the recording in the forward path of the recording head scan, and after completing the inclined line-group keytone with respect to this recording in the forward path, the dot interpolation is carried out by the recording in the return path of the recording head scan to interpolate between the dots formed by the recording in the forward path. In FIG. 29, the forward path mask MO is used to form the pattern of the dots for the gradation levels "0" to "9", and the return path mask ME is used to form the pattern of the dots for the gradation levels "10" to "19".

Figure 30:
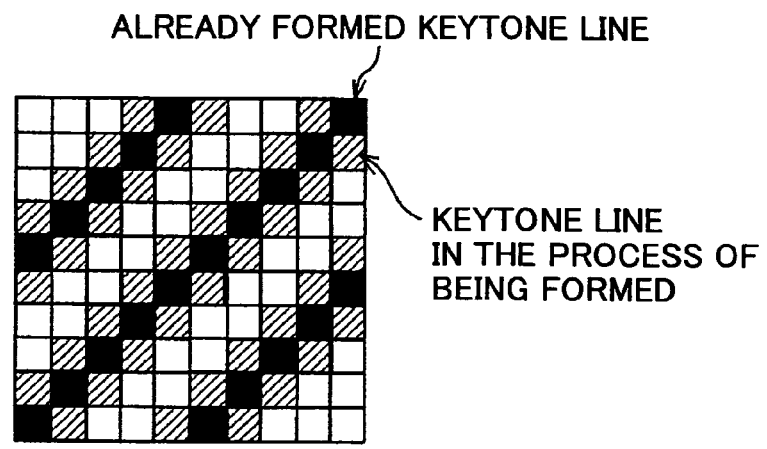
FIG. 30 is a diagram for explaining the dot pattern when a change is made from a reference pattern B to a reference pattern C shown in FIG. 22.

When forming the image, after one keytone line is formed, the already formed keytone line is gradually fattened as described in the Japanese Laid-Open Patent Application No.2004-166163, to represent higher gradation levels. Hence, when the change is made from the reference pattern B shown in (b) of FIG. 22 to the reference pattern C show in (c) of FIG. 22, for example, all of the already complete keytone lines are recorded for both the recording in the forward and return paths of the recording head scan as indicated by black squares representing the dots in FIG. 30, and only the dots on the keytone lines that are in the process of being formed are recorded separately for the forward and return paths of the recording head scan as indicated by squares with hatching representing the dots in FIG. 30. FIG. 30 is a diagram for explaining the dot pattern when the change is made from the reference pattern B to the reference pattern C shown in FIG. 22.

Figure 31:
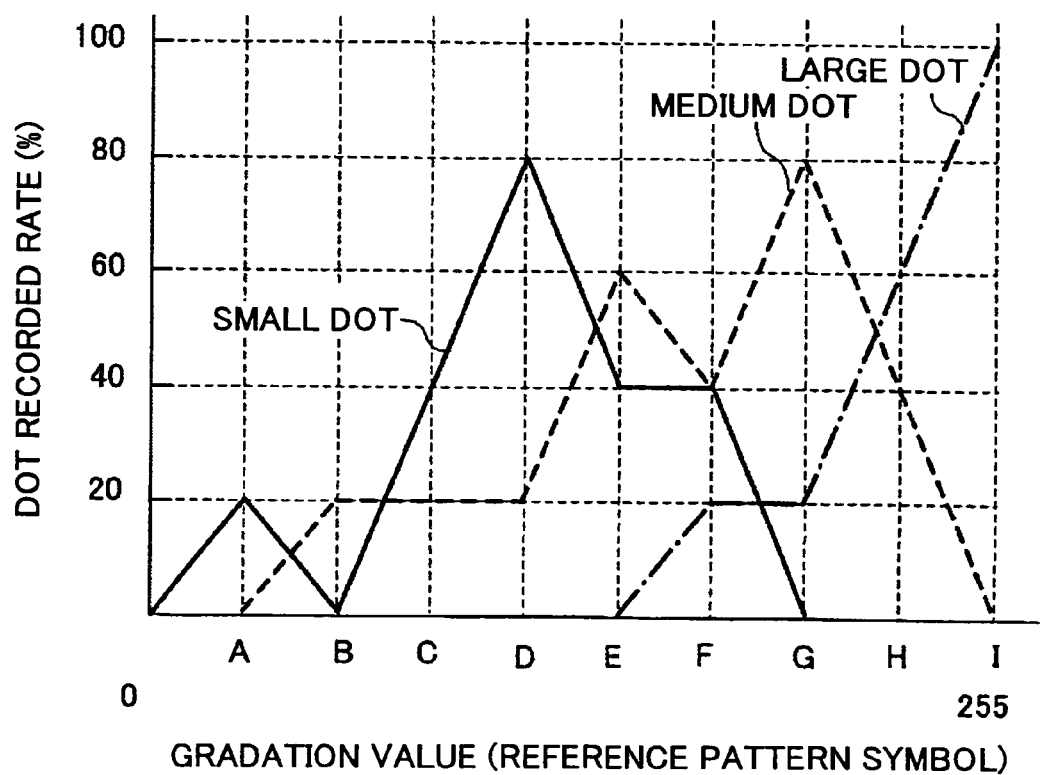
FIG. 31 is a diagram for explaining a usage rate of each dot for all gradation levels for a case where three kinds of dot sizes are used.

When three kinds of dot sizes are used by using three kinds of ink drop sizes, namely, the large ink drop, the medium ink drop and the small ink drop, a usage rate (or recorded rate) of the dots for each of the gradation levels becomes as shown in FIG. 31. FIG. 31 is a diagram for explaining the usage rate (or recorded rate) of each dot for all gradation levels for the case where three kinds of dot sizes are used. In FIG. 31, the ordinate indicates the dot recorded rate (%), and the abscissa indicates the gradation value (reference pattern symbol). In addition, in FIG. 31, the reference pattern symbols A through I corresponding to the reference patterns A through I shown in (a) through (i) of FIG. 22. Furthermore, a solid line indicates the dot recorded rate for the small dots (small ink drops), a dotted line indicates the dot recorded rate for the medium dots (medium ink drops), and a one-dot chain line indicates the dot recorded rate for the large dots (large ink drops).

Figure 32:
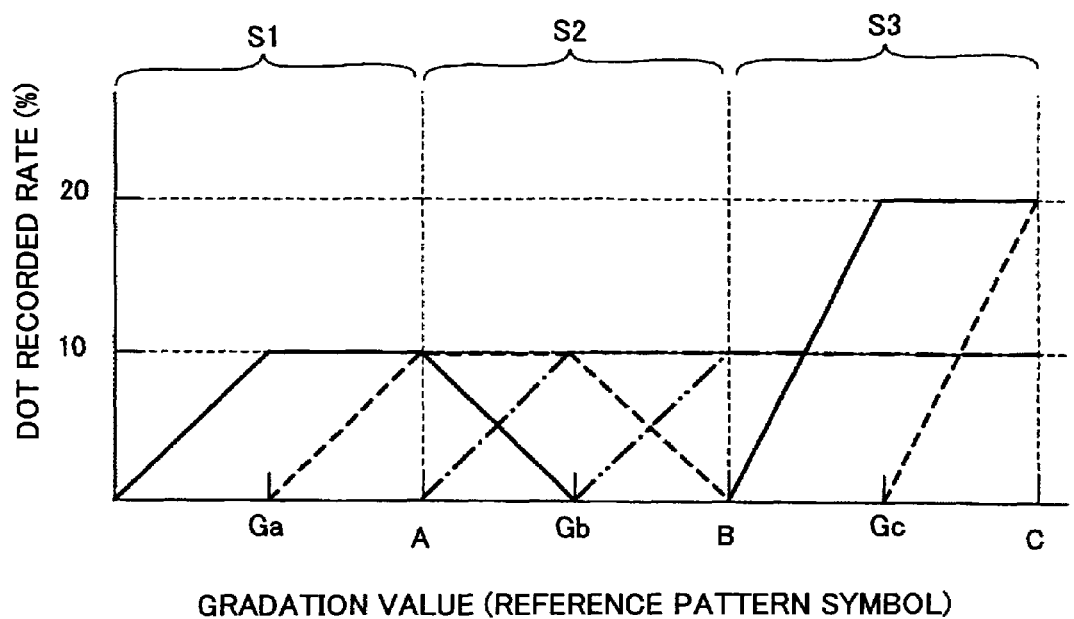
FIG. 32 is a diagram for explaining in more detail the usage rate of each dot for sections from a blank pattern to the reference pattern C in FIG. 27.

FIG. 32 is a diagram for explaining in more detail the usage rate (or recorded rate) of each dot for sections from a blank pattern to the reference pattern C in FIG. 27. In FIG. 32, the ordinate indicates the dot recorded rate (%), and the abscissa indicates the gradation value (reference pattern symbol). Further, a solid line indicates the dot recorded rate for the small dots (small ink drops) during recording in the forward path, a dotted line indicates the dot recorded rate for the small dots (small ink drops) during the recording in the return path, a one-dot chain line indicates the dot recorded rate for the medium dots (medium ink drops) during the recording in the forward path, and a two-dot chain line indicates the dot recorded rate for the medium dots (medium ink drops) during the recording in the return path.

A section S1 shown in FIG. 32 corresponds to the gradation levels from the blank pattern to the reference pattern A shown in FIG. 31. A gradation level Ga shown in FIG. 32 is located at the midpoint of the blank pattern and the reference pattern A. In this case, the dot recorded rate of the small dots recorded during the recording in the forward path reaches 10%. This means that only the a forward path portion of the reference pattern A, corresponding to the forward path, is completed. Thereafter, the small dots are recorded during the recording in the return path in a section from the gradation level Ga to the gradation level A, and the reference pattern A is completed at the gradation level A.

A section S2 shown in FIG. 32 corresponds to the gradation levels from the reference pattern A to the reference pattern B shown in FIG. 31. A gradation level Gb shown in FIG. 32 is located at the midpoint of the reference pattern A and the reference pattern B. In this case, the dot recorded date of the small dots recorded during the recording in the forward path changes from 10% to 0%, and the recorded dot rate of the medium dots recorded during the recording in the forward path changes from 0% to 10%. First, the small dots are replaced by the medium dots during the recording in the return path. Thereafter, he small dots are replaced by the medium dots during the recording in the return path in a section from the gradation level Gb to the gradation level B, and the reference pattern B is completed at the gradation level B.

A section S3 shown in FIG. 32 corresponds to the gradation levels from the reference pattern B to the reference pattern C shown in FIG. 31. A gradation level Gc shown in FIG. 32 is located at the midpoint of the reference pattern B and the reference pattern C. In this case, the keytone lines that are already completed are fixed for all gradation levels in the section S3 and are recorded during the recording in both the forward and return paths. Then, the dot recorded date of the small dots recorded on both sides of the keytone lines reaches 20% during only the recording in the forward path. Thereafter, the small dots are recorded during the recording in the return path in a section from the gradation level Gc to the gradation level C, and the reference pattern C is completed at the gradation level C.

The dot arrangement that interpolates between each of the reference patterns is formed similarly thereafter, by recording the completed keytone lines that are completed prior to reaching the reference pattern during the recording in both the forward and return paths, and selectively recording in the forward or return path only for the dots that are to be newly added to increase the gradation value (or dots that are to be recorded by a larger ink dot).

According to the dither mask used in the present invention, the dots are recorded only during the recording in the forward path until the keytone line recorded in the forward path is completed. For this reason, no two-way impact error is generated. In other words, it is possible to record the keytone lines of every other line at ideal positions. In addition, since the keytone line is recorded during the recording in the forward path at an early stage where the gradation value is low, it is possible to improve the continuity of the keytone.

In addition, the dots that are recorded during the recording in the return path, which may be recorded at positions deviated from the target positions due to the two-way impact error, are arranged so as to interpolate the keytone lines of every other line after the keytone lines recorded by the recording in the forward path is completed. For this reason, the positional error of the dots recorded during the recording in the return path becomes relatively inconspicuous. This is also effective from the point of view of the mask design method that maintains the continuity of the keytone.

In other words, by preferentially allocating the dots during the recording in the forward path of the two-way recording head scan for the keytone line that is in the process of being formed, in the method of the Japanese Laid-Open Patent Application No.2004-166163, it becomes possible to suppress the effects of the two-way impact error to a minimum and form an image having a high keytone continuity, even in an environment in which the two-way impact error occurs.

When carrying out the halftone process based on the inclined line-group keytone by maintaining the keytone continuity, the previously formed keytone becomes dominant by carrying out the halftone process in which the inclined line-group keytone appears at the stage where the recording in the forward path of the two-way recording head scan is made. For this reason, even if the two-way impact error occurs, it is possible to improve the picture quality by reducing the deterioration of the formed keytone.

According to the dither mask used in the present invention, the threshold values at the dot positions formed by the recording in the forward path are small relative to the threshold values at the dot positions formed by the recording in the return path, in the section from the gradation value (gradation value of the reference pattern) which emphasizes the inclined line-group keytone pattern by the combination of specific dots, to the gradation value (gradation value of the next reference pattern) which emphasizes the inclined line-group keytone pattern by the combination of specific dots. Consequently, it is possible to carry out a halftone process in which the inclined line-group keytone appears at a stage where the recording in the forward direction is made, using a relatively simple structure.

According to experiments conducted by the present inventors, it was found that visually, it is possible to carry out a halftone process in which the inclined line-group keytone appears at a stage where the recording in the forward path is made, by setting at least 70% of the threshold values at the dot positions that are recorded during the recording in the forward path smaller than the threshold values at the dot positions that are recorded during the recording in the return path.

Although the effects of the present invention are described above with respect to the two-way impact error, the present invention is also effective with respect to an impact error that is caused by the mounting accuracy or the like of the recording head that has the nozzles arranged symmetrically to the right and left for the purpose of eliminating the two-way color difference.

Moreover, when employing the multi-path recording, the present invention is effective not only for the impact error with respect to the main scanning direction but also with respect to the sub scanning direction. More particularly, the dither mask may be made to maintain the keytone continuity by setting the threshold values as described above for each dot group that is recorded in the multi-path.

In the embodiment described above, the printer driver causes the computer to execute the image processing method according to the present invention so as to form the image processing apparatus. However, the image forming apparatus itself may be provided with a means for executing the image processing method according to the present invention.

This application claims the benefit of a Japanese Patent Application No.2004-344602 filed Nov. 29, 2004, in the Japanese Patent Office, the disclosure of which is hereby incorporated by reference.

Further, the present invention is not limited to these embodiments, but various variations and modifications may be made without departing from the scope of the present invention.

The invention claimed is:

1. An image processing method for processing image data to be output to an image forming apparatus that is capable of making a two-way recording to form an image on a recording medium by recording in a forward path and a return path of a scan by an ink-jet recording head, comprising:
a halftone process that is based on an inclined line-group keytone and maintains keytone continuity,
wherein the halftone process includes a dither process in which the inclined line-group keytone appears at a stage where the recording in the forward path is made,
wherein the dither process uses a dither mask that is formed by first patterns and second patterns, the first patterns have a plurality of different threshold values by combinations of dots recognizable as inclined line-group tone patterns, and the second patterns interpolate between the first patterns to obtain linear gradation values, and
wherein first threshold values of the dither mask at dot positions recorded during the recording in the forward oath are small relative to second threshold values of the dither mask at dot positions recorded during the recording in the return oath in a section between the first and second threshold values, the first threshold values emphasize the inclined line-group keytone pattern by a combination of specific dots, and the second threshold values are higher than the first threshold values and emphasize the inclined line-group keytone pattern by a combination of specific dots.

2. The image processing method as claimed in claim 1, wherein at least 70% of the first threshold values at the dot positions during the recording in the forward path are smaller than the second threshold values at the dot positions during the recording in the return path.

3. The image processing method as claimed in claim 1, wherein the dither mask used in the dither process part copes with a two-way interlace recording or a multi-path recording of the image forming apparatus.

4. A printer driver for causing a computer to execute a halftone process according to the image processing method recited in claim 1, to output the image data to the image forming apparatus.

5. An image processing apparatus provided with the printer driver recited in claim 4, to carry out a halftone process with respect to the data to be output to the image forming apparatus.

6. An image forming apparatus capable of making a two-way recording to form an image on a recording medium by recording in a forward path and a return path of a scan by an ink-jet recording head, comprising:
a halftone process part configured to carry out a halftone process that is based on an inclined line-group keytone and maintains keytone continuity,
wherein the halftone process part includes a dither process part configured to carry out a dither process in which the inclined line-group keytone appears at a stage where the recording in the forward path is made,
wherein the dither process uses a dither mask that is formed by first patterns and second patterns, the first patterns have a plurality of different threshold values by combinations of dots recognizable as inclined line-group tone patterns, and the second patterns interpolate between the first patterns to obtain linear gradation values, and
wherein first threshold values of the dither mask at dot positions recorded during the recording in the forward path are small relative to second threshold values at dot positions recorded during the recording in the return path in a section between the first and second threshold values, the first threshold values emphasize the inclined line-group keytone pattern by a combination of specific dots, and the second threshold values are higher than the first threshold values and emphasize the inclined line-group keytone pattern by a combination of specific dots.

7. The image forming apparatus as claimed in claim 6, wherein at least 70% of the first threshold values at the dot positions during the recording in the forward path are smaller than the second threshold values at the dot positions during the recording in the return path.

8. The image forming apparatus as claimed in claim 6, wherein the dither mask used by the dither process part copes with a two-way interlace recording or a multi-path recording of the image forming apparatus.

9. An image forming system comprising:
  an image processing apparatus recited in claim 5; and
  an image forming apparatus configured to make a two-way recording to form an image on a recording medium by recording in a forward path and a return path of a scan by an ink-jet recording head, the image forming apparatus comprising
  a halftone process part configured to carry out a halftone process that is based on an inclined line-group keytone and maintains keytone continuity,
  wherein the halftone process part includes a dither process part configured to carry out a dither process in which the inclined line-group keytone appears at a stage where the recording in the forward path is made,
  wherein the dither process uses a dither mask that is formed by first patterns and second patterns, the first patterns have a plurality of different threshold values by combinations of dots recognizable as inclined line-group tone patterns, and the second patterns interpolate between the first patterns to obtain linear graduation values, and
  wherein first threshold values of the dither mask at dot positions recorded during the recording in the forward path are small relative to second threshold values at dot positions recorded during the recording in the return path in a section between the first and second threshold values, the first threshold values emphasize the inclined line-group keytone pattern by a combination of specific dots, and the second threshold values are higher than the first threshold values and emphasize the inclined line-group keytone pattern by a combination of specific dots.

10. The image processing method of claim 1 wherein the inclined line-group keytone comprises dots of different dot sizes.

11. The image processing method of claim 1, wherein the image processing method reduces disorder of the inclined line-group keytone, caused by two-way impact error.

\* \* \* \* \*